US012756774B2

United States Patent
(12) United States Patent
Park et al.

(10) Patent No.: US 12,756,774 B2
(45) Date of Patent: Oct. 6, 2026

(54) ELECTRONIC DEVICE COMPRISING FLEXIBLE DISPLAY, AND AN OPERATION METHOD THEREOF

(71) Applicant: SAMSUNG ELECTRONICS CO., LTD., Suwon-si (KR)

(72) Inventors: Sunghwan Park, Suwon-si (KR); Myunghoon Kwak, Suwon-si (KR); Jookwan Lee, Suwon-si (KR); Yangwook Kim, Suwon-si (KR); Jihea Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 281 days.

(21) Appl. No.: 18/383,980

(22) Filed: Oct. 26, 2023

(65) Prior Publication Data

US 2024/0056519 A1 Feb. 15, 2024

Related U.S. Application Data

(63) Continuation of application No. PCT/KR2022/007171, filed on May 19, 2022.

(30) Foreign Application Priority Data

Jul. 14, 2021 (KR) ........................ 10-2021-0092409

(51) Int. Cl.

| | |
|---|---|
| ***H04M 1/02*** | (2006.01) |
| ***G06F 1/16*** | (2006.01) |
| ***G09G 3/00*** | (2006.01) |

(52) U.S. Cl.

CPC ........ *H04M 1/0268* (2013.01); *G06F 1/1652* (2013.01); *G09G 3/035* (2020.08)

(58) Field of Classification Search

CPC ........................... H04W 52/027; G06F 1/3212

See application file for complete search history.

(56) References Cited

U.S. PATENT DOCUMENTS 9,299,314 B2 3/2016 Lee et al.
10,379,720 B2 8/2019 Ryu et al.
(Continued)

FOREIGN PATENT DOCUMENTS

EP 2947543 A1 11/2015
EP 4321979 A1 2/2024
(Continued)

OTHER PUBLICATIONS

Extended European Search Report Issued In EP Application No. 22842270.5-1218, Mail Date Sep. 18, 2024, 12 Pages.
(Continued)

*Primary Examiner* — Steven Lim
(74) *Attorney, Agent, or Firm* — CANTOR COLBURN LLP

(57) ABSTRACT

Disclosed are an electronic device including a flexible display, and an operation method thereof. The electronic device may include a battery for power supply, a display unit, and at least one processor. The display unit may include at least one flexible display. As a state of the electronic device switches from a first state to a second state, a screen display area among a display area of the display unit may change from a first area to a second area. In the first state, a first indicator relating to a battery residual capacity identified according to the size of the first area may be displayed through the first area. In the second state, a second indicator relating to a battery residual capacity identified according to the size of the second area may be displayed through the second area.

20 Claims, 30 Drawing Sheets

(56) References Cited

U.S. PATENT DOCUMENTS

| | | | | |
|---|---|---|---|---|
| 10,936,017 | B1 * | 3/2021 | Choi | G06F 1/1652 |
| 2007/0188145 | A1 | 8/2007 | Kim et al. | |
| 2010/0048253 | A1 | 2/2010 | Park et al. | |
| 2014/0068314 | A1 | 3/2014 | Kim et al. | |
| 2015/0378557 | A1 | 12/2015 | Jeong et al. | |
| 2016/0026381 | A1 * | 1/2016 | Kim | G06F 3/04817 715/761 |
| 2019/0278465 | A1 | 9/2019 | Zhou et al. | |
| 2021/0149436 | A1 | 5/2021 | Myung et al. | |
| 2023/0206808 | A1 | 6/2023 | Kim et al. | |
| 2023/0221785 | A1 | 7/2023 | Lee et al. | |

FOREIGN PATENT DOCUMENTS

| | | | |
|---|---|---|---|
| KR | 100656588 | B1 | 12/2006 |
| KR | 100715317 81 | | 5/2007 |
| KR | 20100023604 | A | 3/2010 |
| KR | 20140128593 | A | 11/2014 |
| KR | 101595388 | B1 | 2/2016 |
| KR | 101627713 | B1 | 6/2016 |
| KR | 20160126942 | A | 11/2016 |
| KR | 20170019072 | A | 2/2017 |
| KR | 101762666 | B1 | 7/2017 |
| KR | 20200059445 | A | 5/2020 |
| KR | 20200064573 | A | 6/2020 |
| KR | 20210059445 | A | 5/2021 |
| KR | 20220058185 | A | 5/2022 |
| KR | 20220064615 | A | 5/2022 |

OTHER PUBLICATIONS

Korean Office Action Issued In KR Application No. 10-2021-0092409; Mail Date Sep. 22, 2025; 14 Pages.

* cited by examiner

ELECTRONIC DEVICE COMPRISING FLEXIBLE DISPLAY, AND AN OPERATION METHOD THEREOF

CROSS-REFERENCE TO RELATED APPLICATIONS

This application is a continuation of International Application No. PCT/KR2022/007171 designating the United States, filed on May 19, 2022, and claiming priority to Korean Patent Application No. 10-2021-0092409, filed on Jul. 14, 2021, in the Korean Intellectual Property Office, the disclosures of each of which are incorporated by reference herein in their entireties.

TECHNICAL FIELD

Various embodiments disclosed herein relate to an electronic device including a flexible display and an operation method thereof.

BACKGROUND ART

Recently, a flexible electronic device having a physical shape or size that is changeable has become widely used. In a case of a slidable type of electronic device or a foldable type of electronic device, a structure enabling an extension or reduction of a display is adopted to satisfy demands for a wide screen and for mobility. For example, in a slide-in state or a folded state of an electronic device, a display can be reduced and mobility can be maintained. In a slide-out state or an unfolded state of the electronic device, the display is extended to provide a wide screen.

DISCLOSURE OF INVENTION

Technical Problem

When the size of a display of an electronic device is fixed, battery consumption may be reduced in a constant manner.

Compared to this, in a case of a flexible type of electronic device having a display size that changes, battery consumption may vary according to a change in the display size. For example, in a slide-in state or a folded state of the electronic device, a reduced display is used and thus battery consumption may be relatively small. In a slid-out state or an unfolded state of the electronic device, an extended display is used, and thus battery consumption may relatively increase.

Regardless of the extension or the reduction of the display, a battery icon is statically displayed and a change in the battery consumption is not reflected in real time. As such, a user often cannot accurately identify the state of a battery or may feel anxiety about lack of power in the battery, and thus usability may be reduced.

If the extension and the reduction are frequently repeated while using the flexible type electronic device, the state of the battery may frequently change.

Accordingly, various embodiments disclosed herein may provide an electronic device including a flexible display, which can implement a dynamic user interface reflecting a real-time battery state in a structure in which the size of a display changes, and an operation method thereof.

Various embodiments disclosed herein may provide an electronic device including a flexible display, which allows a user to intuitively recognize the battery state according to a change in the size of the display to enhance usability, and an operation method thereof.

Various embodiments disclosed herein may provide an electronic device including a flexible display, which reduces anxiety over lack of power in a battery due to repeated operations of extending or reducing the display so as enhance usability, and an operation method thereof.

Technical problems to be solved by the disclosure are not limited to the technical problems mentioned above, and other technical problems that are not mentioned may be understood from the description below by those skilled in the art to which the disclosure belongs.

Solution to Problem

An electronic device according to various embodiments may include a battery configured to supply power to the electronic device, a display unit, and at least one processor connected to the battery and the display unit. The display unit may include at least one flexible display, wherein as a state of the electronic device switches from a first state to a second state, a screen display area among a display area of the at least one flexible display changes from a first area to a second area which is different from the first area. The at least one processor may be configured to display a first indicator relating to a battery residual capacity identified according to the size of the first area, through the first area in the first state, and display, a second indicator relating to a battery residual capacity identified according to the size of the second area, through the second area in the second state.

An operation method of an electronic device according to various embodiments may include displaying, in a first state in which a screen display area among a display area of the at least one flexible display corresponds to a first area, a first indicator relating to a battery residual capacity identified according to a size of the first area, detecting a user input of switching a state of the electronic device from the first state to a second state, and displaying, in the second state in which the screen display area is changed to a second area having a size different from that of the first area, through the second area, a second indicator relating to a battery residual capacity identified according to the size of the second area.

Advantageous Effects of Invention

According to various embodiments, a dynamic user interface reflecting a battery state in real time in a structure in which the size of a display changes can be implemented.

According to various embodiments, a user can intuitively recognize a battery state according to a change in the size of a display, whereby usability can be enhanced.

According to various embodiments, anxiety over lack of power in a battery due to repeated operations of extending or reducing a display can be reduced, whereby usability can be enhanced.

In addition, various effects directly or indirectly identified through the disclosure can be provided.

MODE FOR CARRYING OUT THE INVENTION

Hereinafter, various embodiments will be described with reference to the attached drawings.

Figure 1:
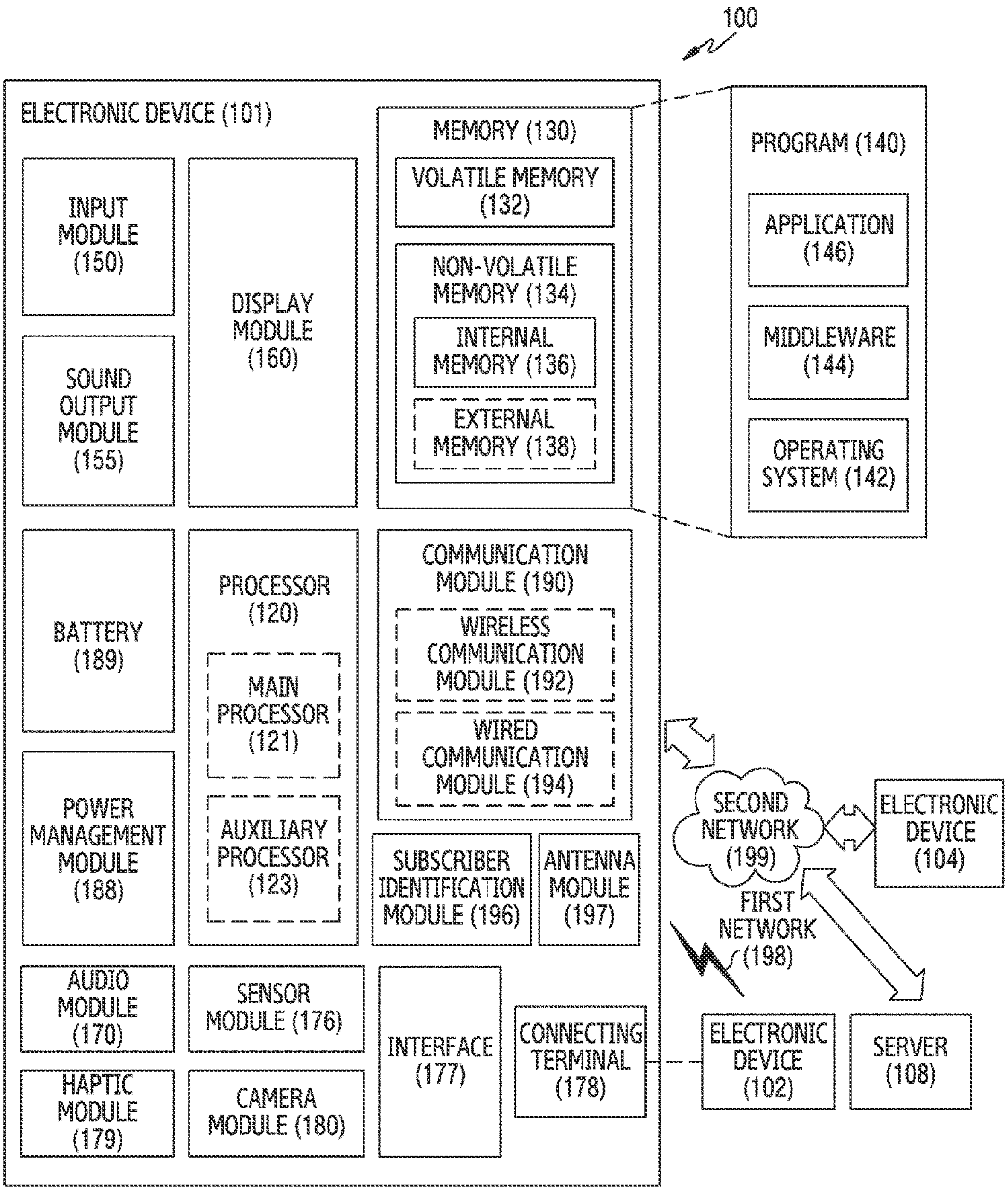
FIG. 1 is a block diagram illustrating an electronic device in a network environment according to various embodiments.

FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
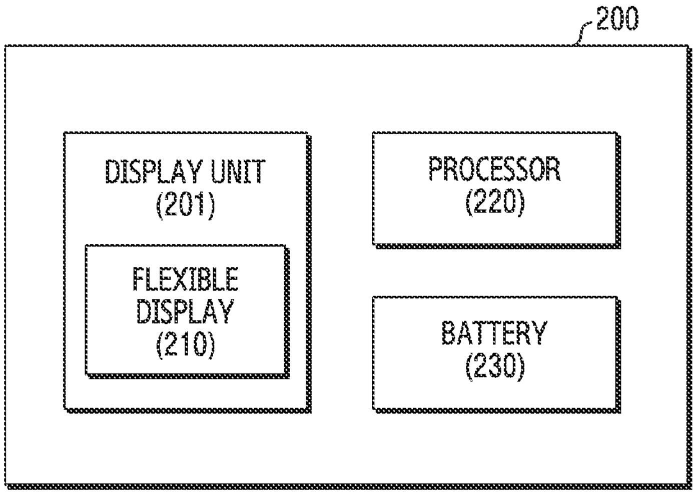
FIG. 2 is a block diagram illustrating an electronic device according to an embodiment.

FIG. 2 is a block diagram illustrating an electronic device according to an embodiment.

Referring to FIG. 2, an electronic device 200 according to an embodiment may include a display unit 201, a processor 220, and a battery 230 for supplying power to the electronic device 200.

The display unit 201, the processor 220, and the battery 230 included in the electronic device 200 may be electrically and/or operatively connected to each other to exchange signals (e.g., commands or data) with each other.

In FIG. 2, elements of the electronic device 200 may correspond to elements of the electronic device 101 illustrated in FIG. 1. For example, the display unit 201 may include the display module 160 of FIG. 1, or may correspond to the display module 160. The processor 220 may correspond to the processor (one of 120, 121, or 123) of FIG. 1. The battery 230 may correspond to the battery 189 of FIG. 1.

In an embodiment, the display unit 201 may include at least one flexible display 210. Each flexible display 210 may include a display area. The display area of the flexible display 210 may mean a usable area that is physically available (or in hardware-wise) for display.

Figure 3A:
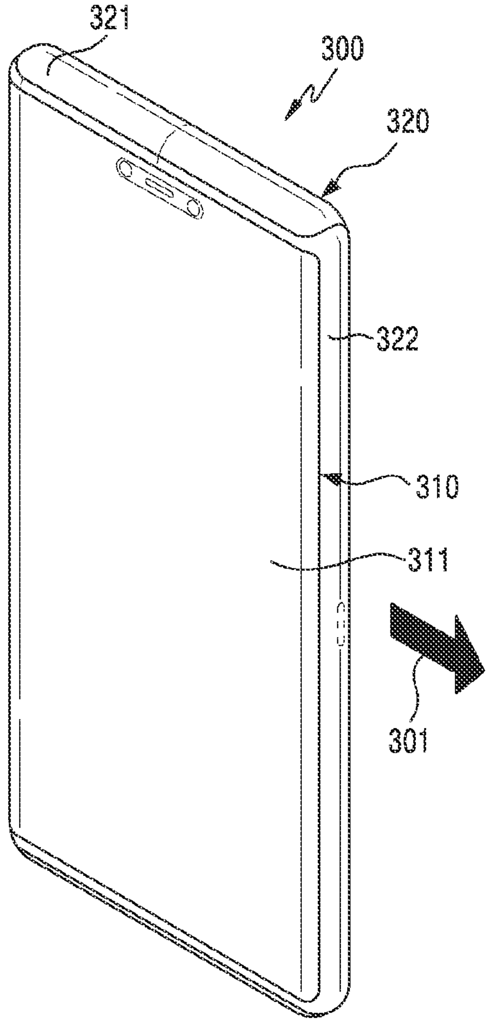
FIG. 3A is a perspective view illustrating a slide-in state of a slidable electronic device according to an embodiment.
Figure 4A:
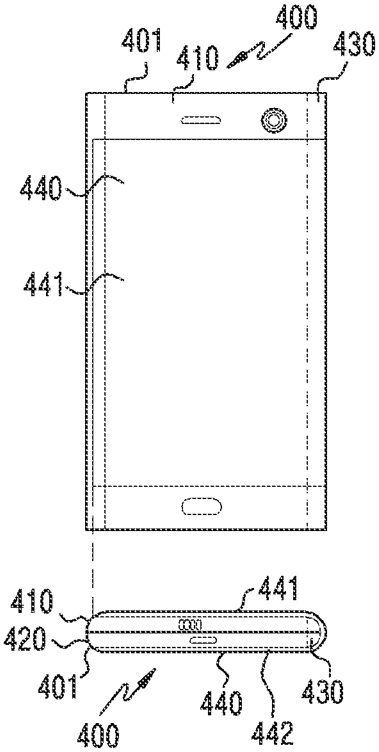
FIG. 4A illustrates a front surface and a lower surface in a folded state of an out-folding type foldable electronic device according to an embodiment.
Figure 5A:
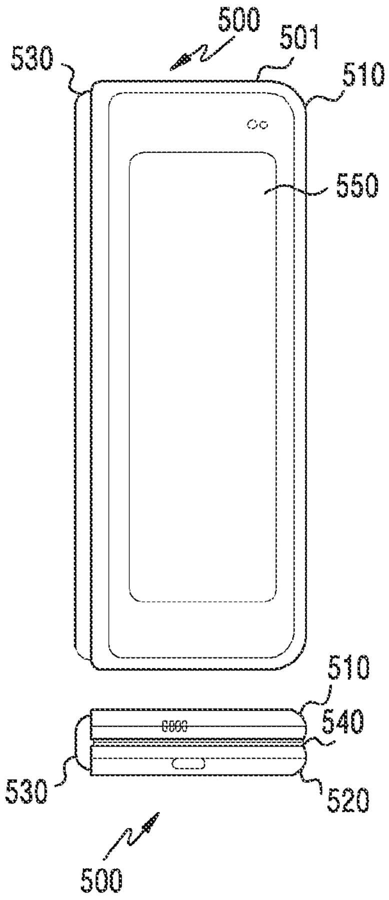
FIG. 5A illustrates a front surface and a lower surface in a folded state of an in-folding type foldable electronic device according to an embodiment.
Figure 6A:
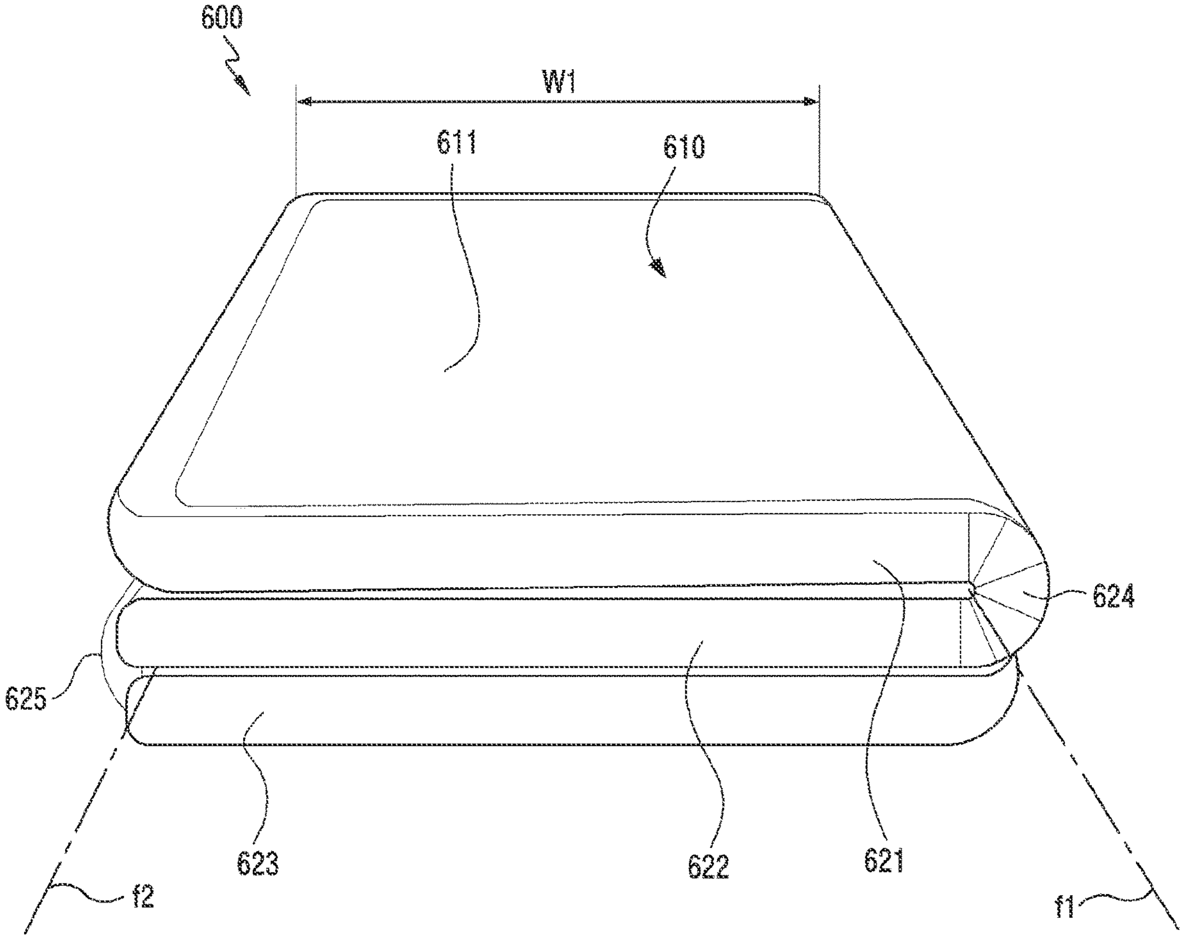
FIG. 6A is a perspective view illustrating a fully folded state of a multi-foldable electronic device according to an embodiment.

For example, the flexible display 210 may correspond to one of a flexible display 310 of FIG. 3A, a flexible display 440 of FIG. 4A, a first flexible display 540 of FIG. 5A, a second flexible display 550 of FIG. 5A, and a flexible display of FIG. 6A.

As a mechanical state of the electronic device 200 changes, the size of a screen display area among the display area of the flexible display 210 may change (e.g., extend or reduce).

The display area (or the entire display area) of the display unit 201 may correspond to an area obtained by combining display areas of the respective at least one flexible display 210. For example, when the display unit 201 includes one flexible display 210, a display area of the display unit 201 may be identical to a display area of the flexible display 210. In another example, when the display unit 201 includes multiple (e.g., two or three) flexible displays 210, a display area of the display unit 201 may mean an area obtained by combining all display areas of the flexible displays 210.

Hereinafter, in order to easily distinguish the display area of the display unit 201 from the display area of an individual flexible display 210, the display area of the display unit will be referred to as an "entire display area".

The electronic device 200 may change the mechanical state and have a structure (e.g., a sliding structure or a folding structure) for changing (e.g., extending or reducing) the size of the screen display area among the entire display area of the display unit 201.

As the mechanical state of the electronic device 200 changes, the size (or the area) of the screen display area among the entire display area of the display unit 201 may change.

As the mechanical state of the electronic device 200 switches from a first state (e.g., a slide-in state, a folded state, or a reduced state) to a second state (e.g., a slide-out state, an unfolded state, or an extended state), the screen display area among the entire display area of the display unit 201 may change from a first area to a second area. The first area may have a size different from that of the second area. A screen may be displayed through the screen display area. The battery consumption may change in accordance with the change in the size of the screen display area.

The processor 220 may include at least one processor. For example, the processor 220 may include an application processor (AP) (e.g., a main processor 121) and a communication processor (CP) (e.g., an auxiliary processor 123). The processor 220 may execute/control various functions supported by the electronic device 200. The processor 220 may execute a code written in a programming language stored in a memory (e.g., the memory 130 of FIG. 1) to execute an application and control various types of hardware.

Although not shown, the electronic device 200 may include a sensor structure (not shown, e.g., one or more Hall sensors/magnets, multiple switches, a gyro sensor, an acceleration sensor, a grip sensor, a gesture sensor, a proximity sensor, an IR sensor, an optical sensor, an ultrasonic distance sensor, and a propagation distance sensor) for detecting a change in the mechanical state and/or the change in the screen display area.

The processor 220 may identify the change in the mechanical state of the electronic device 200 and/or the change in the size of the screen display area through the sensor structure.

The processor 220 may control the display unit 201.

The processor 220 may display, in a first state (e.g., a slide-in state, a folded state, or a reduced state) of the electronic device 200 through a first area of the display unit 201, a first indicator relating to a battery residual capacity identified according to the size of the first area. The first area may correspond to a screen display area used in the first state, among the entire display area.

The processor 220 may display, in a second state (e.g., a slide-out state, an unfolded state, or an extended state) of the electronic device 200 through a second area of the display unit 201, a second indicator relating to a battery residual capacity identified according to the second size. The second area may correspond to a screen display area used in the second state, among the entire display area.

In an embodiment, the first indicator may have a first display property indicating the size of the first area and a battery residual capacity corresponding to the size of the first area. The second indicator may have a second display property indicting the size of the second area and a battery residual capacity corresponding to the second size.

In an embodiment, while the electronic device 200 is in the first state, the first indicator and the second indicator may be displayed together. In addition, as the state of the electronic device 200 switches from the first state to the second state, the display property of each of the first indicator and the second indicator may be switched.

In an embodiment, each of the first indicator and the second indicator may indicate information on at least one of a usable time of the battery 230, a charging rate of the battery 230, and an increase or decrease rate of the battery according to a change in the size of the screen display area.

In an embodiment, the first indicator and the second indicator may display, differently from each other, at least one display property among a size, a color, a form, a shape, a pattern, transparency, an effect, a shadow, a type, a layer, and a layout.

In an embodiment, when a user input for switching the state of the electronic device 200 from a first state (a state in which a screen display area has a first size) to a second state (a state in which a screen display area has a second size) is detected, the processor 220 may determine a power mode of the electronic device 200 as at least one of a fully charged mode, a normal mode, a low power mode, an ultra-low power mode, based on a battery residual capacity corresponding to the second size. The processor 220 may indicate information on the power mode of the electronic device 200 through the second indicator.

In an embodiment, when a user input for switching the state of the electronic device 200 from the first state (the state in which the screen display area has the first size) to the second state (the state in which the screen display area has the second size) is detected, the processor 220 may determine whether the battery residual capacity corresponding to first size is less than a threshold value. The processor 220 may output a user interface indicating lack of the battery residual capacity when the battery residual capacity corresponding to the first size is less than the threshold value. In addition, when the battery residual capacity (or the current battery residual capacity) corresponding to the first size is less than the threshold value, the processor 220 may block the switching to the second state.

Hereinafter, a mechanical structure of an electronic device according to various embodiments will be described with reference to FIGS. 3A, 3B, 4A, 4B, 4C, 5A, 5B, 5C, 6A, 6B, and 6C.

Each of the illustrated electronic devices may correspond to the electronic device 101 of FIG. 1 or the electronic device 200 of FIG. 2, or may include at least a part of the elements of FIG. 1 or FIG. 2.

Figure 5B:
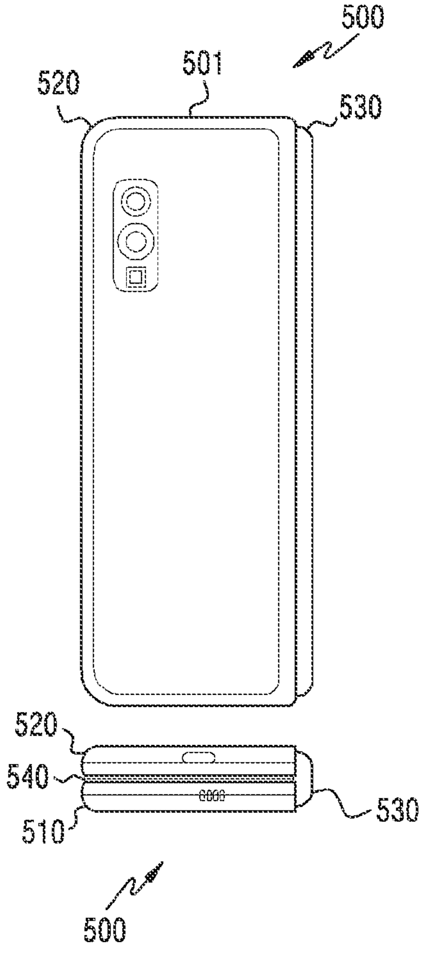
FIG. 5B illustrates a rear surface and a lower surface in a folded state of an in-folding foldable electronic device according to an embodiment.
Figure 5C:
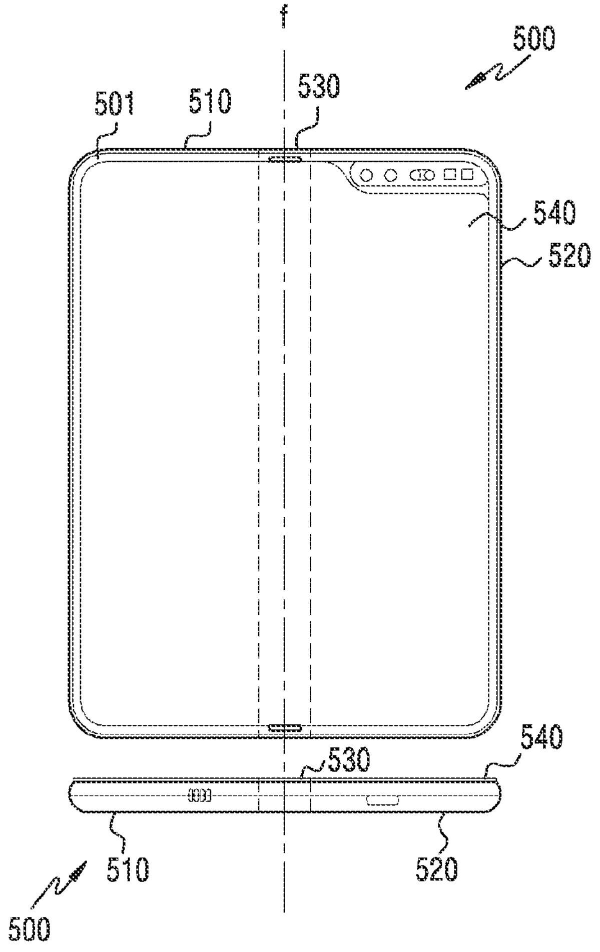
FIG. 5C illustrates a front surface and a lower surface in an unfolded state of an in-folding foldable electronic device according to an embodiment.
Figure 6B:
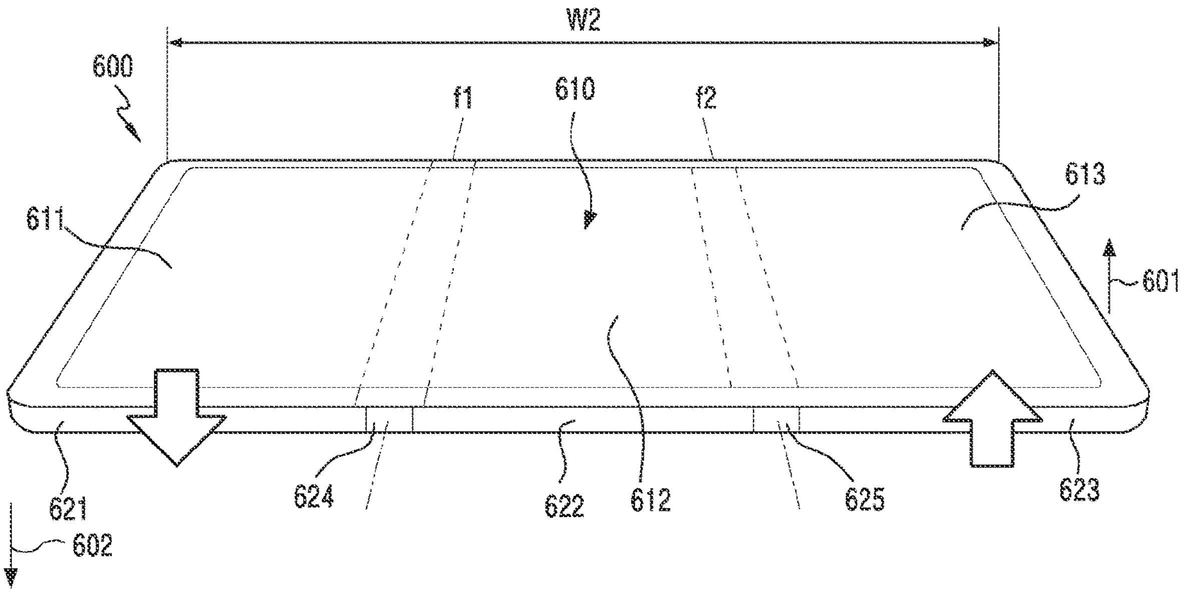
FIG. 6B is a perspective view illustrating a fully unfolded state of a multi-foldable electronic device according to an embodiment.
Figure 6C:
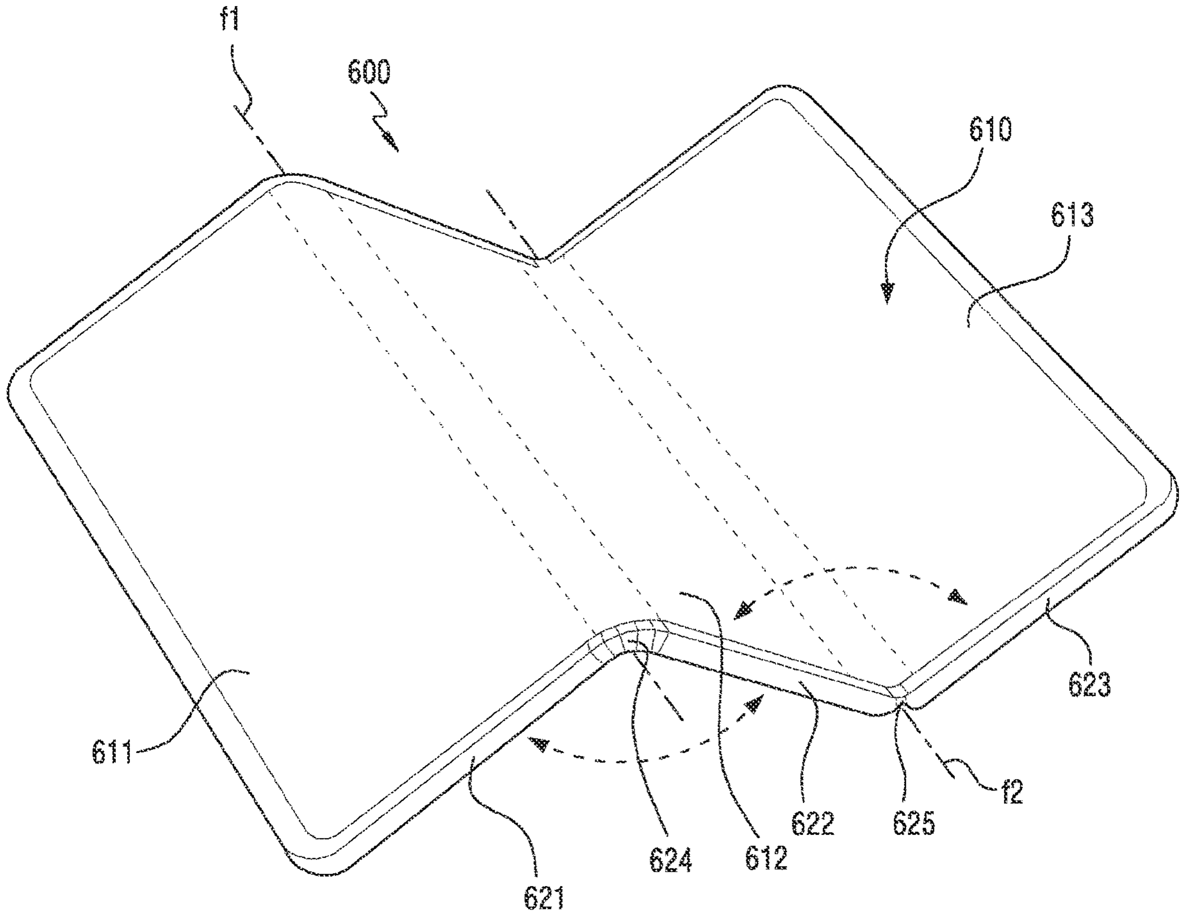
FIG. 6C is a perspective view illustrating a partially folded state of a multi-foldable electronic device according to an embodiment.

For example, an electronic device according to an embodiment may correspond to a slidable electronic device (e.g., the electronic device 300 of FIG. 3A or 3B), an out-folding type electronic device (e.g., the electronic device 400 of FIG. 4A, 4B, or 4C), an in-folding type electronic device (e.g., the electronic device 500 of FIG. 5A, 5B, or 5C), and a multi-folding type electronic device (e.g., the electronic device 600 of FIG. 6A, 6B, or 6C).

The illustrated structure is merely provided to help understanding, and the ranges of the embodiments are not limited to a specific structure. Within the range including a flexible display, various embodiments which modify, change, apply, and extend the illustrated structure are possible.

Figure 3B:
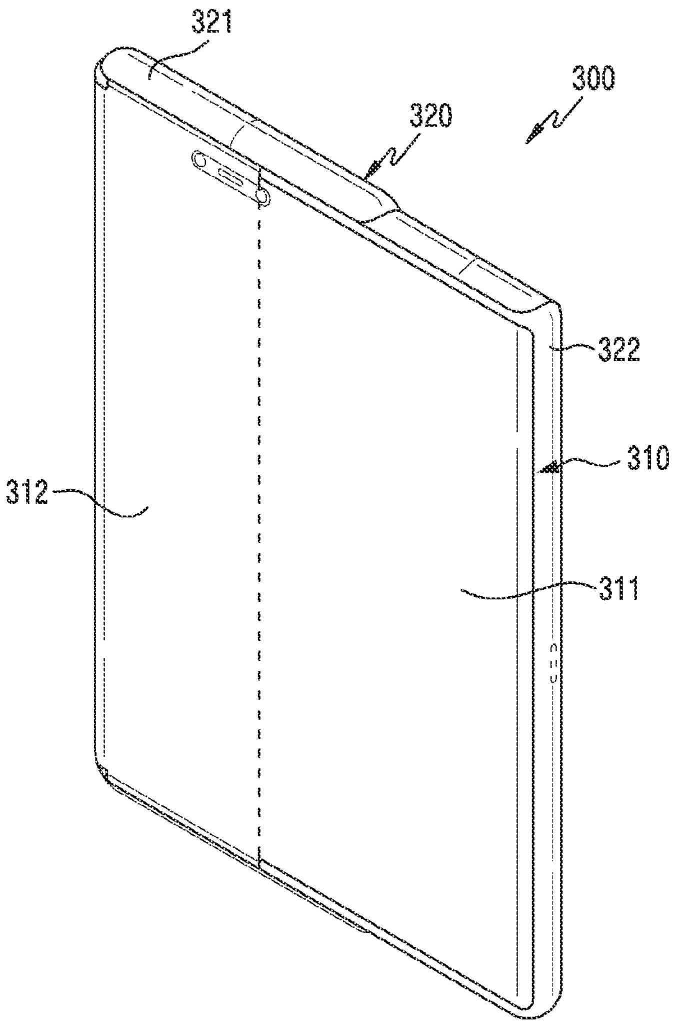
FIG. 3B is a perspective view illustrating a slide-out state of a slidable electronic device according to an embodiment.

For example, FIGS. 3A and 3B illustrate a transversely slidable type electronic device, but an electronic device according to an embodiment may be one of a longitudinally slidable type electronic device, a multi-axis slidable type electronic device which can slide in opposite directions (e.g., a transverse direction or a longitudinal direction) with reference to multiple axes, and a rollable type electronic device which allows a substantially entire flexible display (e.g., 90% or more of the entire area) to slide in one direction (e.g., a transverse or longitudinal direction) and rolled into a rotating body in a housing or extracted to the outside of the housing and folded.

Figure 4B:
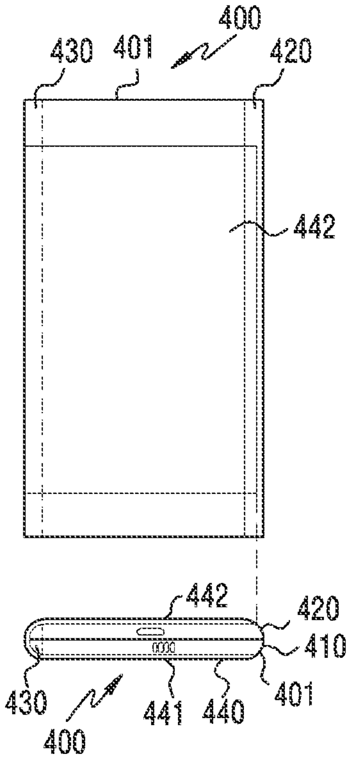
FIG. 4B illustrates a rear surface and a lower surface in a folded state of an out-folding type foldable electronic device according to an embodiment.
Figure 4C:
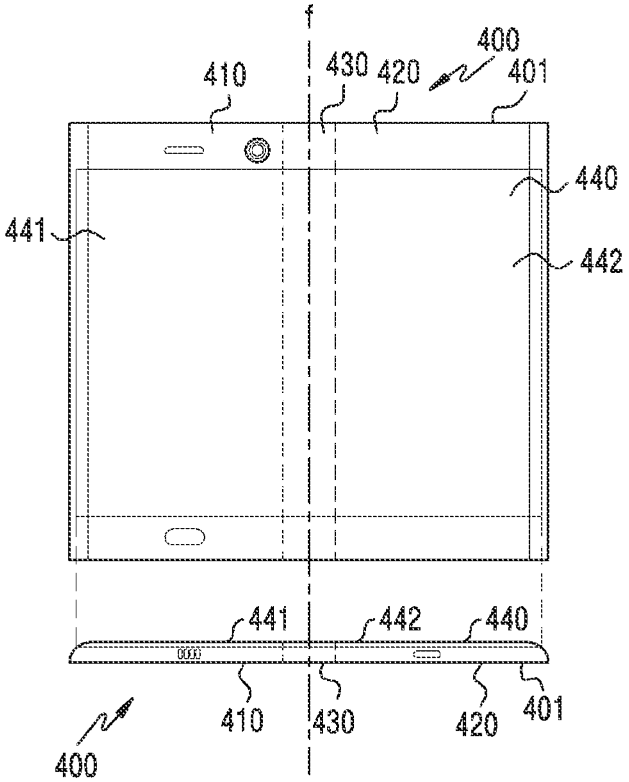
FIG. 4C illustrates a front surface and a lower surface in an unfolded state of an out-folding type foldable electronic device according to an embodiment.

In another example, FIGS. 4A, 4B, and 4C illustrate an out-folding type electronic device, and FIGS. 5A, 5B, and 5C illustrate an in-folding type electronic device, but an electronic device according to an embodiment may also be a bidirectional folding type electronic device.

FIG. 3A is a perspective view illustrating a slide-in state of a slidable electronic device according to an embodiment. FIG. 3B is a perspective view illustrating a slide-out state of a slidable electronic device according to an embodiment.

Referring to FIGS. 3A and 3B, an electronic device 300 may include a flexible display 310 and a housing 320. The flexible display 310 may correspond to the flexible display 210 of FIG. 2. A display area of the flexible display 310 may include a first area 311 and a second area 312. The housing 320 may include a first housing 321 and a second housing 322.

The flexible display 310 may be inserted into the housing 320 or extracted from the housing 320 by a sliding operation. A part of the flexible display 310 may slide out in a first direction 301 to be extracted to the outside of the electronic device 300 (or the housing 320), or may slide in according to a second direction opposite to the first direction to be inserted into the electronic device 300 (or the housing 320).

The flexible display 310 may be located on a front surface of the electronic device 300. For example, the flexible display 310 may occupy the most of a front area of the electronic device 300. The housing 320 surrounding at least a part of the edge of the flexible display 310 may be disposed on the front surface of the electronic device 300. For example, the housing 320 may form a partial area of a front surface, a side surface, and a rear surface of the electronic device 300. In another example, the housing 320 may form a partial area of the side surface and the rear surface of the electronic device 300.

The housing 320 may include a first housing 321 and a second housing 322. The second housing 322 may be coupled to the first housing 321 to be slidably moved with respect to the first housing 321. The second housing 322 may slide out according to the first direction 301, and may slide in according to the second direction that is opposite to the first direction 301. For example, a driving source for sliding movement of the second housing 322 may be manually, automatically, or semi-automatically driven. The sliding driving source is semi-automatically driven, a sliding guide member or a sliding driving body (e.g., a motor) may be used, and when a sliding driving source is automatically driven, a roller type guide member or a roller driving body (e.g., a motor) may be used, but the sliding or roller type does not need to be limited.

The display area of the flexible display 310 may include a first area 311 coupled to the second housing 322 to be always exposed to the outside of the electronic device 300, and a second area 312 which extends from the first area 311 and can be inserted into the electronic device 300 by a sliding operation.

The flexible display 310 may be coupled to a front surface of the second housing 322 to be slidably moved together with the second housing 322. The movement of the second housing 322 may be understood as movement of the flexible display 310. The size of a screen display area exposed to the outside of the electronic device 300, among the display area of the flexible display 310 may be configured to be changed (e.g., extended or reduced) based on the sliding movement of the second housing 322.

According to the movement of the second housing 322, when the state of the electronic device 300 switches from the slide-in state as shown in FIG. 3A to the slide-out state as shown in FIG. 3B, the second area 312 of the flexible display 310 may be extracted from the inside of the electronic device 300 to the outside thereof. In the slide-out state as shown in FIG. 3B, the entire area of the display area of the flexible display 310 is exposed to the outside of the electronic device 300, and thus the display area may be identical to the screen display area.

According to the movement of the second housing 322, when the state of the electronic device 300 switches from the slide-out state as shown in FIG. 3B to the slide-in state as shown in FIG. 3A, the second area 312 of the flexible display 310 may be inserted from the outside of the electronic device 300 to the inside thereof. In the slide-out state as shown in FIG. 3A, only the first area 311 remaining after excluding the second area 312 of the display area of the flexible display 310 is exposed to the outside of the electronic device 200, and thus the first area 311 may correspond to the screen display area.

When the second housing 322 slides out according to the first direction 301, the second area 312 of the flexible display 310 may be extracted from the inside of the electronic device 300 to the outside thereof, and a screen display area of the display area of the flexible display 310 may be extended. When the second housing 322 slides in according a second direction opposite to the first direction 301, the second area 312 of the flexible display 310 may be inserted into the electronic device 300, and a screen display area of the display area of the flexible display 310 may be reduced.

In such a structure, the state of the electronic device 300 may switch from the sliding-in state as shown in FIG. 3A to the sliding-out state as shown in FIG. 3B by the sliding operation.

As the mechanical state of the electronic device 300 switches, the screen display area exposed to the outside of the electronic device 300, among the display area of the flexible display 310, may be changed from the first area 311 to an area including the first area 311 and the second area 312. Accordingly, the size of the screen display area may change from a first size to a second size.

The electronic device 300 may display a first indicator relating to a battery residual capacity corresponding to a first size that is the size of the first area 311, through the flexible display 310 in the sliding-in state as shown in FIG. 3A.

The electronic device 300 may display a second indicator relating to a battery residual capacity corresponding to a second size that is a size obtained by combining the first area 311 and the second area 312, through the flexible display 310 in the sliding-out state as shown in FIG. 3B. The second indicator may be related to the battery residual capacity calculated based on the second size.

FIG. 4A illustrates a front surface and a lower surface in a folded state of an out-folding type foldable electronic device according to an embodiment. FIG. 4B illustrates a rear surface and a lower surface in a folded state of an out-folding type foldable electronic device according to an embodiment. FIG. 4C illustrates a front surface and a lower surface in an unfolded state of an out-folding type foldable electronic device according to an embodiment.

Referring to FIGS. 4A, 4B, and 4C, an electronic device 400 may include a foldable housing 401 and a flexible display 440. The flexible display 440 may correspond to a flexible display 210 of FIG. 2.

In an embodiment, the flexible display 440 may include a display area including a first area 441 and a second area 442. In the folded state as shown in FIGS. 4A and 4B, the first area 441 among the display area of the flexible display 440 may be seen through the front surface of the electronic device 400, and the second area 442 may be folded toward the rear surface of the electronic device 400 and may not be seen through the front surface of the electronic device. In the unfolded state as shown in FIG. 4C, the second area 442 may be unfolded toward the front surface of the electronic device 400, and both the first area 441 and the second area 442 may be seen through the front surface of the electronic device 400.

In an embodiment, when the electronic device 400 is in the unfolded state as shown in FIG. 4C, the front surface of the electronic device 400 may be a surface on which the flexible display 440 is disposed. When the electronic device 400 is in the unfolded state as shown in FIG. 4C, the rear surface of the electronic device 400 may be a surface that is opposite to the surface on which the flexible display 440 is disposed. When the electronic device 400 is in the folded state as shown in FIGS. 4A and 4B, the front surface of the electronic device 400 may be a surface on which the first area 441 of the flexible display 440 is disposed. When the electronic device 400 is in the folded state as shown in FIGS. 4A and 4B, the rear surface of the electronic device 400 may be a surface on which the second area 442 of the flexible display 440 is disposed.

Referring to FIGS. 4A, 4B, and 4C, the foldable housing 401 may include a first housing 410, a second housing 420, and a folding unit 430.

In an embodiment, the first housing 410 and the second housing 420 may have an overall shape symmetric to each other with reference to a folding axis f of the folding unit 430.

The folding unit 430 may correspond to a folding structure. The folding unit 430 may support the first housing 410 and the second housing 420 to be folded in the out-folding scheme. For example, the folding unit 430 may allow the first housing 410 and the second housing 420 to be rotatably connected to each other. The folding unit 430 may provide a pivot movement of the first housing 410 and the second housing 420.

In an embodiment, the out-folding operation may include an operation in which the first area 441 and the second area 442 of the flexible display 440 are folded so that the first area and the second area are oriented in different directions.

In the unfolded state of the electronic device 400, the first housing 410 and the second housing 420 may be parallel to each other.

At least a part of the flexible display 440 may be supported by the first housing 410 and the second housing 420. The display area of the flexible display 440 may include the first area 441 and the second area 442.

Referring to FIGS. 4A and 4B, in the folded state of the electronic device 400, the first area 441 among the display area of the flexible display 440 may be seen through the front surface of the electronic device 400 to face a user, and the second area 442 may be folded toward the rear surface of the electronic device 400 so as not to face the user.

Referring to FIG. 4C, in the unfolded state of the electronic device 400, the entire display area 441 and 442 of the flexible display 440 may be seen through the front surface of the electronic device 400 to face the user.

In such a structure, the state of the electronic device 400 may be switched from the folded state as shown in FIGS. 4A and 4B to the unfolded state as shown in FIG. 4C by the folding operation using the folding unit 430.

As the mechanical state of the electronic device 400 is switched by the operation of the folding unit 430, a screen display area seen through the front surface of the electronic device 400, among the display area of the flexible display 440, may be changed from the first area 441 to the entire area including the first area 441 and the second area 442. Accordingly, the size of the screen display area may change from a first size to a second size. The first size may be a size of the first area 441. The second size may be a size of an area obtained by combining the first area 441 and the second area 442.

In the folded state as shown in FIGS. 4A and 4B, the electronic device 400 may display a first indicator relating to a battery residual capacity corresponding to a first size which is the size of the first area 441, through the flexible display 440.

In the unfolded state as shown in FIG. 4C, the electronic device 400 may display a second indicator relating to a battery residual capacity corresponding to a second size is the size of an area obtained by combining the first area 441 and the second area 442, through the flexible display 440. The second indicator may be related to the battery residual capacity calculated based on the second size.

FIG. 5A illustrates a front surface and a lower surface in a folded state of an in-folding type foldable electronic device according to an embodiment. FIG. 5B illustrates a rear surface and a lower surface in a folded state of an in-folding type foldable electronic device according to an embodiment. FIG. 5C illustrates a front surface and a lower surface in an unfolded state of an in-folding type foldable electronic device according to an embodiment.

Referring to FIGS. 5A, 5B, and 5C, an electronic device 500 may include a foldable housing 501, a first flexible display 540, and a second flexible display 550. Each of the first flexible display 540 and the second flexible display 550 may correspond to the flexible display 210 of FIG. 2.

In an embodiment, the first flexible display 540 may be an external display disposed on an outer surface of the electronic device 500. The second flexible display 550 may be an internal display disposed on an inner surface of the electronic device 500.

In the folded state of the electronic device 500 as shown in FIGS. 5A and 5B, the first flexible display 540 may be exposed to the outside of the electronic device 500. The second flexible displays 550 may be folded to face or overlap with each other in the electronic device 500 so as not to be exposed to the outside of the electronic device 500.

In the unfolded state of the electronic device 500 as shown in FIG. 5C, the second flexible display 550 may be unfolded to be exposed to the outside of the electronic device 500.

Referring to FIGS. 5A, 5B, and 5C, the foldable housing 501 may include a first housing 510, a second housing 520, and a folding unit 530.

In an embodiment, the first housing 510 and the second housing 520 may have an overall shape symmetric to each other with reference to a folding axis f of the folding unit 530.

The folding unit 530 may support the first housing 510 and the second housing 520 to be folded in an in-folding scheme. For example, the folding unit 530 may allow the first housing 510 and the second housing 520 to be rotatably connected to each other. The folding unit 530 may provide a pivot movement of the first housing 510 and the second housing 520.

In an embodiment, the first flexible display 540 may be coupled to one surface (e.g., a surface corresponding to an outer surface of the electronic device 500) of the foldable housing 501 to be exposed to the outside of the electronic device 500 through the one surface.

The second flexible display 550 may be coupled to the other surface (e.g., a surface corresponding to an inner surface of the electronic device 500) of the foldable housing 501. The second flexible display 550 may not be exposed to the outside of the electronic device in the folded state of the electronic device 500. The second flexible display 550 may be exposed to the outside of the electronic device 500 through the other surface of the housing 501 in the unfolded state of the electronic device 500.

Referring to FIG. 5C, in the unfolded state of the electronic device 500, the first housing 510 and the second housing 520 may be parallel to each other. In the folded state of the electronic device 500, the second flexible display 550 may not be exposed to the outside of the electronic device 500 and may not be seen by the user. In the unfolded state of the electronic device 500, the second flexible display 550 may be exposed to the outside of the electronic device 500 and may be seen by the user.

In a such structure, the state of the electronic device 500 may be switched from the folded state as shown in FIGS. 5A and 5B to the unfolded state as shown in FIG. 5C by the folding operation using the folding unit 530.

A display area of the first flexible display 540 and a display area of the second flexible display 550 may have different sizes.

As the mechanical state of the electronic device 500 is switched by the operation of the folding unit 530, a display area activated among the entire display area including the display area of the first flexible display 540 and the display area of the second flexible display 550 may change. The activated display area among the entire display area may correspond to a screen display area.

In an embodiment, as the mechanical state of the electronic device 500 is switched, a display area among the first flexible display 540 and the second flexible display 550 may be solely activated.

For example, in the folded state of the electronic device 500 as shown in FIGS. 5A and 5B, the first flexible display 540 may be activated, and when the state switches to the folded state as shown in FIG. 5C, the second flexible display 550 may be activated.

For example, in the folded state of the electronic device 500 as shown in FIGS. 5A and 5B, a display area of the first flexible display 540 (or the first flexible display 540) may be activated. The first flexible display 540 may have a display area having a first size that is smaller than that of the second display 550. In this case, the size of the screen display area among the entire display area including the display area of the first flexible display 540 and the display area of the second flexible display 550 may correspond to the first size which is the size of the display area of the first flexible display 540.

In another example, in the unfolded state of the electronic device 500 as shown in FIG. 5C, a display area of the second flexible display 550 (or the second flexible display 550) may be activated. The second flexible display 550 may have a display area having a second size (e.g., twofold of the first size) larger than the first flexible display 540. In this case, the size of the screen display area among the entire display area including the display area of the first flexible display 540 and the display area of the second flexible display 550 may correspond to the second size which is the size of the display area of the second flexible display 550.

As the mechanical state of the electronic device 500 changes, the size of the screen display area of the entire display area including both the display area of the first flexible display 540 and the display area of the second flexible display 550 may change from the first size to the second size.

In the folded state as shown in FIGS. 5A and 5B, the electronic device 500 may display a first indicator relating to a battery residual capacity corresponding to the first size which is the size of the display area of the first flexible display 540, through the first flexible display 540.

In the unfolded state as shown in FIG. 5C, the electronic device 500 may display a second indicator relating to a battery residual capacity corresponding to the second size which is the size of the display area of the second flexible display 550, through the second flexible display 550. The second indicator may be related to the battery residual capacity calculated based on the second size which is the size of the screen display area.

FIG. 6A is a perspective view illustrating a fully folded state of a multi-foldable electronic device according to an embodiment. FIG. 6B is a perspective view illustrating a fully unfolded state of a multi-foldable electronic device according to an embodiment. FIG. 6C is a perspective view illustrating a partial folded state of a multi-foldable electronic device according to an embodiment.

An electronic device 600 according to an embodiment may correspond to the electronic device 101 of FIG. 1 or the electronic device 200 of FIG. 2.

Referring to FIGS. 6A, 6B, and 6C, the electronic device 600 corresponds to a multi-foldable electronic device 600 capable of performing Z-folding, and may include a first housing 621, a second housing 622, a third housing 623, a first folding unit 624, a second folding unit 625, and a flexible display 610.

In an embodiment, the electronic device 600 may be a multi-foldable electronic device 600 capable of performing Z-folding, wherein the first and second housings 621 and 622 are folded according to a first folding operation by the first folding unit 624 and the second and third housings 622 and 623 are folded according to a second folding operation by the second folding unit 625. For example, the first folding operation may include an out-folding operation, and the second folding operation may include an in-folding operation. Hereinafter, the first folding operation is referred to as an out-folding operation, and the second folding operation is referred to as an in-folding operation.

In an embodiment, the first folding unit 624 may support the first housing 621 and the second housing 622 to be folded in a first folding scheme corresponding to one of an in-folding scheme and an out-folding scheme. The second folding unit 625 may allow the second housing 622 and the third housing 623 to be folded in a second folding scheme corresponding to the other one of the in-folding scheme and the out-folding scheme.

In an embodiment, the out-folding operation may include an operation in which in the folded state, first and second areas 611 and 612 of the flexible display 610 can be folded to face opposite directions from each other. The in-folding operation may include an operation in which second and third areas 612 and 613 can be folded to face each other.

In an embodiment, the first folding unit 624 allows the out-folding operation of the first and second housings 621 and 622, and the second folding unit 625 allows the in-folding operation of the second and third housings 622 and 623.

The mechanical state of the electronic device 600 may be changed in response to the folding states of the first and second folding units 624 and 625 (e.g., an out-folding unit and an in-folding unit). For example, the mechanical state of the electronic device 600 illustrated in FIG. 6A may be a fully folded state in which the electronic device is folded with reference to the first and second folding units 624 and 625, that is, the electronic device has the narrowest width W1. In another example, the mechanical state of the electronic device 600 illustrated in FIG. 6B may be a fully unfolded state in which the first and second folding units 624 and 625 are unfolded, that is, the electronic device has the widest width W2. In another example, the mechanical state of the electronic device 600 illustrated in FIG. 6C may be a partially folded state according to intermediate folding states of the first and second units 624 and 625.

In an embodiment, in the fully folded state, the electronic device 600 folds the first housing 621 downwards (e.g., in a second direction 602) by a first folding angle and folds the third housing 623 upwards (e.g., in a first direction 601) by a second folding angle, to be switched to the partially folded state. For example, each of the first and second folding angles may be an angle between about 0 and 180. When the first and second folding angles are 0 degrees, the state of the electronic device may be the fully folded state, and when the first and second folding angles are 180 degrees, the state of the electronic device may be a fully unfolded state. The first folding unit 624 may provide a first folding axis f1, and the second folding unit 625 may provide a second folding axis f2 that is parallel to the first folding axis f1.

In an embodiment, according to pressure applied by a user, the electronic device 600 may perform the out-folding operation by the first folding unit 624, and may sequentially perform the in-folding operation by the second folding unit 625. For example, according to such a folding operation, the state of the electronic device 600 may switch from the partially folded state to the fully folded state. In another example, the electronic device 600 may simultaneously perform folding operations by the first and second folding units 624 and 625 in response to bidirectional pressure applied by the user, that is, a force (e.g., a downward force) applied in the second direction 602 for the first housing 621 and a force (e.g., an upward force) applied in the first direction 601 for the third housing 623, and may be switched to the fully folded state.

In an embodiment, the electronic device 600 may include a flexible display 610 disposed to traverse the first to third housings 621, 622, and 623. The flexible display 610 may be disposed on the first to third housings 621, 622, and 623 in the first direction 601 (for example, a direction in which a user can face the display), and may be disposed in a direction traversing the first to third housings 621, 622, and 623.

In an embodiment, the flexible display 610 may include the first folding unit 624 for the out-folding operation and the second folding unit 625 for the in-folding operation. The first folding unit 624 may be spaced apart from the second folding unit 625. The flexible display 610, as a multi-folding display simultaneously implementing in-folding and out-folding, may include first to third areas 611, 612, and 613 corresponding to the first to third housings 621, 622, and 623, respectively, wherein the first folding unit 624 is disposed between the first and second areas 611 and 612 and the second folding unit 625 is disposed between the second and third areas 612 and 613.

In an embodiment, the entire display area of the flexible display 610 may have a first size corresponding to the size of an area including the first area 611, the second area 612, and the third area 613. For example, the sizes of the first area 611, the second area 613, and the third area 613 may be all identical to the second size. According to the mechanical state (e.g., the fully folded state, the partially folded state, and the fully unfolded state) of the electronic device 600, the size of the screen display area among the entire display area of the flexible display 610 may change. For example, in the first state (e.g., the fully folded state), the size of the screen display area may be the first size (e.g., a minimum size or a basic size). In the second state (e.g., the fully unfolded state), the size of the screen display area may be the second size (e.g., a maximum size). In the third state (e.g., the partially folded state), the size of the screen display area may have a median value (e.g., a middle size or twofold of the minimum size) of the first and the second sizes.

Figure 7:
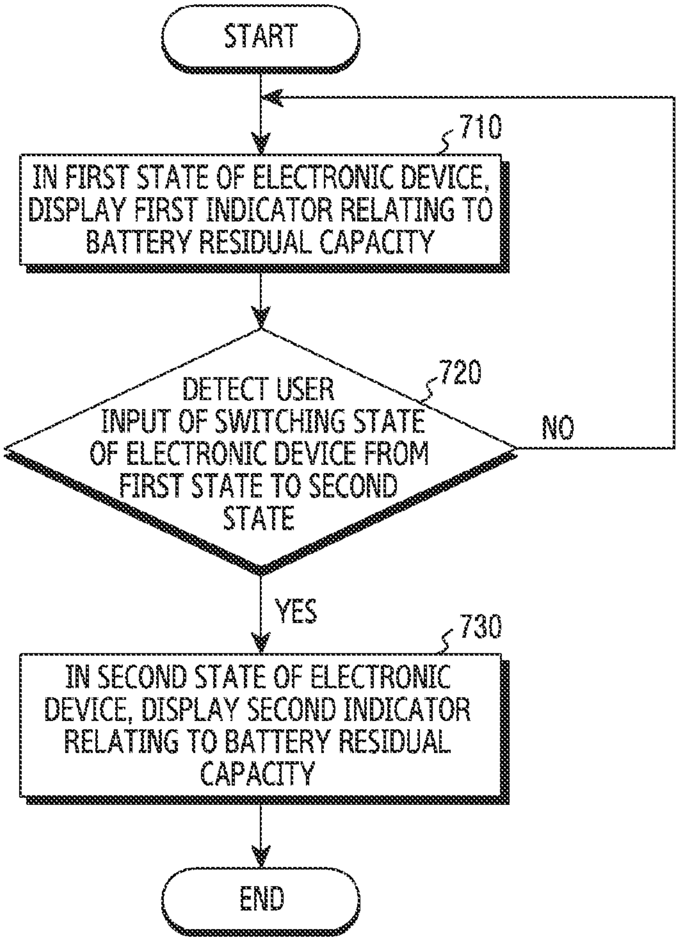
FIG. 7 is a flowchart illustrating an operation method of an electronic device according to an embodiment.

FIG. 7 is a flowchart illustrating an operation method of an electronic device according to an embodiment.

Referring to FIG. 7, an operation method of an electronic device according to an embodiment may include operations 710, 720, and 730. The method may be performed by an electronic device (e.g., the electronic device 200 or the processor 220 of FIG. 2). For convenience of description, each operation of the method above is assumed to be performed by the processor 220 of FIG. 2. In various embodiments, at least one of the illustrated operations may be omitted, a sequence of some operations may be changed, or other operations may be added.

In operation 710, the electronic device 200 may be in a first state (e.g., a slide-in state or a folded state). In the first state, a screen display area among the entire display area of a display unit 201 including at least one flexible display 210 may be a first area. While the electronic device 200 is in the first state, the processor 220 may display a first indicator relating to a battery residual capacity identified according to the size of the first area corresponding to the screen display area.

In operation 720, the processor 220 may detect a user input of switching the state of the electronic device 200 from the first state to a second state (e.g., a slide-out state or an unfolded state). Upon the user input, the electronic device 200 may be switched from the first state to the second state. For example, the user input may be one of a sliding-out input, a sliding-in input, a folding input, an unfolding input, and a multi-folding input.

In operation 730, the electronic device 200 may be in the second state (e.g., the sliding-out state or the unfolded state). In the second state, a screen display area among the entire display area of the display unit 201 including the at least one flexible display 210 may be a second area. The second area may have the same size as that of the first area.

For example, in the sliding scheme as shown in FIGS. 3A and 3B, when the state of the electronic device 200 switches from the slide-in state to the slide-out state, the screen display area may extend from the first area to the second area. The second area may be an area obtained by combining the first area corresponding to the previous screen display area and an area extended by the sliding-out operation. The size of the screen display area may change from a first size (e.g., a basic size or a minimum size) corresponding to the size of the first area to a second size (e.g., a maximum size) corresponding to the size of the second area.

In another example, in the out-folding scheme as shown in FIGS. 4A, 4B, and 4C, when the state of the electronic device 400 switches from the folded state to the unfolded state, the screen display area may extend from the first area to the second area. The second area may correspond to an area obtained by combining the first area corresponding to the previous screen area and an area extended by the folding operation. The size of the screen display area may change from a first size (e.g., a basic size or a minimum size) corresponding to the size of the first area to a second size (e.g., a maximum size) corresponding to the size of the second area.

In another example, in the in-folding scheme as shown in FIGS. 5A, 5B, and 5C, when the state of the electronic device 200 switches from the folded state to the unfolded state, the screen display area may extend from the first area to the second area having a larger size. In this case, the screen display area may switch from a first area corresponding to a display area of an external display to a second area corresponding to a display area of an internal display. The size of the screen display area may change from a first size (e.g., an external display size) corresponding to the size of the first area to a second size (e.g., an internal display size) corresponding to the size of the second area.

While the electronic device 200 is in the second state, the processor 220 may display a second indicator relating to a battery residual capacity identified according to the size of the second area corresponding to the screen display area.

While the electronic device 200 including the at least one flexible display 210 is being used, the battery consumption may vary according to the change in the size of the screen display area.

According to an embodiment, when the state of the electronic device 200 switches from the first state to the second state and the size of the screen display area is changed (e.g., extended or reduced), a first indicator and a second indicator corresponding to respective sizes of different screen display areas may be provided as a dynamic user interface reflecting the battery residual capacity according to the change in the size of the screen display area. In an embodiment, the first indicator may have a first display property indicating the size of the first area and the battery residual capacity corresponding to the size of the first area. The second indicator may have a second display property indicating the size of the second area and the battery residual capacity corresponding to the size of the second area.

In an embodiment, while the electronic device 200 is in the first state, the first indicator and the second indicator may be displayed together (or simultaneously). As the state of the electronic device 200 switches from the first state to the second state, the respective display properties of the first indicator and the second indicator may be switched.

In an embodiment, each of the first indicator and the second indicator may indicate information on at least one of a usable time (or an expected use time) of a battery 230, a charging rate (compared to the fully charged mode) of the battery 230, and an increase or decrease rate of the battery according to a change in the size of the screen display area.

In an embodiment, the first indicator and the second indicator may display, differently from each other, at least one display property among a size, a color, a form, a shape, a pattern, transparency, an effect (e.g., an animation effect or a highlighting effect), a shadow, a type, a layer, and a layout.

In an embodiment, the processor 220 of the electronic device 200 may calculate a battery residual capacity according to a change in the mechanical state of the electronic device 200 or a change in the size of the screen display area, associated with the change in the mechanical state, to update an indicator (e.g., a battery icon) relating to the battery residual capacity. The processor 220 may update the indicator in real time, continuously, and/or periodically. For example, in a case where the mechanical state of the electronic device 200 switches, the battery residual capacity may be calculated at each predetermined period or when the change in the size of the screen display area, associated with the switching of the mechanical state of the electronic device 200, is detected, and the indicator may be updated by applying a result of the calculation.

In operation 710 and/or operation 730, the processor 220 may calculate the battery residual capacity according to the size (or the change in the size) of the screen display area.

An example of a scheme of calculating the battery residual capacity according to the size (or the change in the size) of the screen display area is described below.

The processor 220 may identify a basic battery residual capacity of the battery 230 by using a current and/or a voltage of the battery 230. For example, the basic battery residual capacity, as a value corresponding to a state of charge (SOC) of the battery 230, may be one of a battery charging rate and a battery usable time converted from the battery charging rate. For example, the basic battery residual capacity may be identified by using a terminal voltage measurement technique, an open circuit voltage (OCV) measurement technique, a current integration technique, and an open circuit voltage (OCV) technique.

The electronic device 200 (e.g., a memory of the electronic device 200) may store offset information of offsets for respective sizes of the screen display areas (or respective states of the electronic device 200).

Even though the basic battery capacities are identical, battery consumptions (e.g., consumption current or consumption power) may be different according to the size (or the change in the size) of the screen display area. For example, as the size of the screen display area increases, the battery consumption may increase, and as the size of the screen display area decreases, the battery consumption may decrease.

The offset may be a parameter for reflecting a difference in the battery consumption according to the size of the screen display area to convert the basic battery residual capacity into the battery residual capacity according to the size of the screen display area. For example, the offset may be designated for the size of each of the screen display areas. For example, an offset for a first size (e.g., a basic size or a minimum size) may be designated as 100% (or 1), and an offset for a second size (e.g., a maximum size) may be designated as 80% (or 0.8).

When the current screen display area of the electronic device 200 has a first size (e.g., a basic size or a minimum size) (or when the electronic device 20 is in the first state), the processor 220 may identify an offset mapped to the first size from pre-stored offset information. The processor 220 may convert (e.g., basic battery residual capacity×1) the basic battery residual capacity into a first battery residual capacity according to the first size by using the offset.

When the current screen display area of the electronic device 200 has a second size (e.g., a maximum size) (or when the electronic device 200 is in the second state), the processor 220 may identify an offset mapped to the second size from the pre-stored offset information. The processor 220 may convert (e.g., basic battery residual capacity×0.8) the basic battery residual capacity into a second battery residual capacity according to the second size by using the offset.

In addition, the processor 220 may calculate a battery increase or decrease rate corresponding to a difference between the first battery residual capacity according to the first size and the second battery residual capacity according to the second size.

Another example of a scheme of calculating a battery residual capacity according to the size (or the change in the size) of the screen display area is described below.

The processor 220 may identify a basic battery residual capacity of the battery 230 by using the current and/or the voltage of the battery 230.

The electronic device 200 (e.g., the memory of the electronic device 200) may store offset information of designating an offset according to a different in size between screen display areas. An offset may be a parameter for reflecting a difference in the battery consumption according to the difference in size between the screen display areas. For example, when the state of the electronic device 200 switches and there is a difference in size between the screen display areas, the difference being equal to or greater than a designated value, the offset may be applied and the basic battery residual capacity may be converted into a battery residual capacity according to the size of the screen display area. For example, an offset (e.g., 0.8) for reflecting an increase in the battery consumption may be designated for a case where there is a twofold increase in the size of the screen display area. In another example, a second offset (e.g., 1.2) may be designated for a case where there is a twofold decrease in the size of the screen display area.

When the current screen display area of the electronic device 200 has a first size (e.g., a basic size or a minimum size), the basic battery residual capacity may be used as a first battery residual capacity according to the first size without conversion.

When the current screen display area of the electronic device 200 is enlarged from the first size to a second size (e.g., a maximum size), the processor 220 may identify an offset mapped to a difference between the first size and the second size, and may convert (e.g., basic battery residual capacity×0.8) the basic battery residual capacity into a second battery residual capacity according to the second size by using the offset.

In addition, the processor 220 may calculate a battery increase or decrease rate corresponding to a difference between the first battery residual capacity according to the first size and the second battery residual capacity according to the second size.

In an embodiment, the processor 220 may calculate the battery residual capacity according to the change in the size of the screen display area and display an indicator relating to the calculated battery residual capacity. The indicator may indicate information on at least one of a usable time of the battery 230, a charging rate (compared to a fully charged mode) of the battery 230, and a battery increase or decrease rate according to the change in the size of the screen display area.

The processor 220 may update the indicator relating to the battery residual capacity or a display scheme of the indicator, based on a result of the calculation of the battery residual capacity according to the change in the size of the screen display area.

The processor 220 may calculate the battery residual capacity corresponding to the size of the current screen display area, and identify, from the battery residual capacity, information on at least one of a usable time of the battery 230, a charging rate (compared to a fully charged mode) of the battery 230, and a battery increase or decrease rate according the change in the size of the screen display area (or a battery increase or decrease rate based on a difference between the previous screen display area and the current screen display area).

The processor 220 may update the indicator relating to the battery residual capacity or the display scheme of the indicator by reflecting the corresponding information.

In an embodiment, when a user input for switching the state of the electronic device 200 from the first state to the second state is detected, the processor 220 may determine a power mode of the electronic device as at least one of a fully charged mode, a normal mode, a low power mode, and an ultra-low power mode, based on the second battery residual capacity corresponding to the size of the second area. The processor 220 may display the second indicator so that the second indicator indicates the power mode of the electronic device.

In an embodiment, when a user input for switching the state of the electronic device 200 from the first state to the second state is detected, the processor 220 may determine whether a first battery residual capacity (or a current battery residual capacity) corresponding to the size of the first area is less than a threshold value. The first battery residual capacity corresponding to the size of the first area is less than the threshold value, the processor 220 may output a user interface (e.g., an icon, a message window, or a warning sound) indicating lack of a battery residual capacity. The processor 220 may block switching to the second state when the first battery residual capacity corresponding to the size of the first area is less than the threshold value.

Hereinafter, an exemplary description of a scheme of displaying a user interface according to various embodiments will be made with reference to FIGS. 8A to 13.

In various embodiments, the electronic device 200 may display an indicator (e.g., a battery icon) relating to a battery residual capacity for a first state in which the size of a screen display area is a first size (e.g., a basic size or a minimum size) and a second state in which the size of the screen display area is a second size (e.g., an extended size, a middle size, or a maximum size). The electronic device 200 may dynamically change the scheme of displaying the indicator according to the change in the size of the screen display area. The display area of the indicator may be organically associated with the change in the size of the screen display area.

In various embodiments, as a user interface relating to the battery residual capacity, icon-type indicators may be provided. The indicator may be referred to as other terms such as an icon, an object, a graphic element, and a user interface element.

For example, a battery icon relating to the battery residual capacity may be displayed, and the battery icon may be dynamically changed according to the change in the size of the screen display area.

The indicators are merely illustrated as an example, and the display scheme of the indicator associated with the change in the size of the screen display area may be modified, changed, applied, and/or extended in various ways.

FIGS. 8A to 8D illustrate examples of a scheme of displaying a first type indicator associated with a change in the size of a screen display area in an electronic device according to an embodiment.

The indicators illustrated in FIGS. 8A to 8D may be first type indicators. The first type indicator may include two battery icons corresponding to two screen display areas (e.g., a small screen display area having a first size and a large screen display area having a second size) corresponding to two screen display areas, respectively, according to a change in a mechanical state of the electronic device 200. The first type indicator may include information on a battery usable time. The information may be expressed in the form of a number, text, a picture, or the like.

Figure 8A:
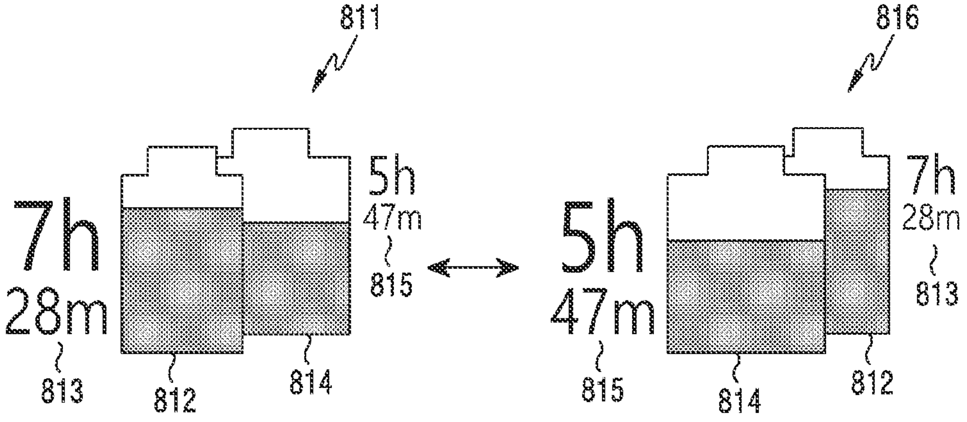
FIG. 8A is an example illustrating a scheme of displaying a first type indicator associated with a change in the size of a screen in an electronic device according to an embodiment.

FIG. 8A is an example illustrating a scheme of displaying a first type indicator according to an embodiment.

In an example of FIG. 8A, reference numeral 811 indicates a first indicator displayed on a screen display area in a first state (e.g., a slide-in state, a reduced state, or a folded state) of the electronic device 200. The first indicator 811 may include a first battery icon 812 and a second battery icon 814, and may dynamically display two battery icons 812 and 814. The first battery icon 812 may correspond to a first size which is the size of a screen display area (a small screen display area) in the first state. The second battery icon 814 may correspond to a second size which is the size of a screen display area (a large screen display area) in the second state. Information on a first battery usable time 813 in the case of the small screen display area may be displayed adjacent to the first battery icon 812. Information on a second battery usable time 815 in the case of the large screen display may be displayed adjacent to the second battery icon 814.

In the first indicator 811, the first battery icon 812 and/or the first battery usable time 813 corresponding to the small screen display area which is a current screen display area may be expressed to have higher visibility than the second battery icon 814 and/or the second battery usable time 815.

Reference numeral 813 indicates a second indicator displayed in a screen display area in a second state (e.g., a sliding-out state, an extended state, or an unfolded state) of the electronic device 200. The second indicator 816 may include a first battery icon 812 and a second battery icon 814, and may simultaneously display two battery icons 812 and 814. The first battery icon 812 may correspond to a first size which is the size of a screen display area (a small screen display) in the first state. The second battery icon 814 may correspond to a second size which is the size of a screen display area (a large screen display area) in the second state. In the second indicator 816, the second battery icon 814 and/or the second battery usable time 815 corresponding to the size of the large screen display area which is a current screen display area may be expressed to have higher visibility than the first battery icon 812 and/or the first battery usable time 813.

The electronic device 200 may be associated with the current screen display area according to the mechanical state of the electronic device 200 to adjust the degree of visibility of each of two battery icons 812 and 814.

While simultaneously displaying the battery icon 812 in the small screen display area and the battery icon 814 in the large display area, the electronic device 200 may perform visual processing so that the first battery icon 812 corresponding to the small screen display area stands out more in the case of the small screen display area, and the second battery icon 814 corresponding to the large display area stands out more in the case of the large screen display area.

For example, in the first state in which the small screen display area is used, the first battery icon 812 may be expressed to be located before the second battery icon 814 as shown in the first indicator 811. In the second state in which the large screen display area is used, the second battery icon 814 may be expressed to be located before the first battery icon 812.

When the size of the screen display area changes, the locations of the battery icons 812 and 814 may be switched according to change in the size of the screen display area. During the switching of the locations the battery icons 812 and 814, an animation effect may be used to allow the user to intuitively recognize the change in the battery residual capacity according to the change in the size of the screen display area.

Figure 8B:
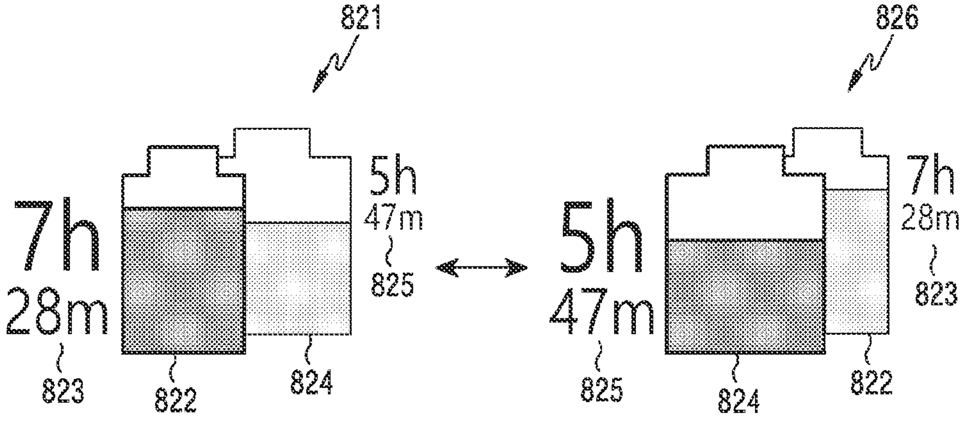
FIG. 8B is another example illustrating a scheme of displaying a first type indicator associated with a change in the size of a screen in an electronic device according to an embodiment.

FIG. 8B is another example illustrating a scheme of displaying a first type indicator according to an embodiment.

In the example of FIG. 8B, reference numeral 821 indicates a first indicator displayed in a screen display area in a first state (e.g., a state in a case of a small display area, such as a slide-in state, a reduced state, or a folded state) of the electronic device 200. Reference numeral 826 indicates a second indicator displayed in a screen display area in a second state (e.g., a state in a case of a large screen display area, such as a slide-out state, an extended state, or an unfolded state) of the electronic device 200.

Each of the first indicator 821 and the second indicator 826 may dynamically display a first battery icon 822 and a second battery icon 824. A first battery usable time 823 in the first state may be displayed adjacent to the first battery icon 822. A second battery usable time 825 in a large screen display area may be displayed adjacent to the second battery icon 824.

In the first indicator 821, the first battery icon 822 and/or the first batter usable time 823 corresponding to the size of the small screen display area which is a current screen display area may be expressed to have higher visibility than the second battery icon 824 and/or the second battery usable time 825.

In the second indicator 826, the second battery icon 824 and/or the second battery usable time 825 corresponding to the size of the large screen display area which is a current screen display area may be expressed to have higher visibility than the first battery icon 822 and/or the first battery usable time 823.

For example, in the first state in which the small screen display area is used, the first battery icon 822 may be expressed more brightly or vividly than the second battery icon 824 as shown in the first indicator 821. In the second state in which the large screen area is used, the second battery icon 824 may be more brightly or vividly expressed or more highlighted than the first battery icon 822 as shown in the second indicator 826. To this end, display properties (e.g., one or more of a color, a form, a shape, a pattern, transparency, a highlighting effect, a layer, and a layout) of the first battery icon 822 and the second battery icon 824 may be differently applied. The display property of the first battery usable time 813 may be associated with the display property of the first battery icon 812. The display property of the second battery usable time 825 may be associated with the display property of the second battery icon 824.

Figure 8C:
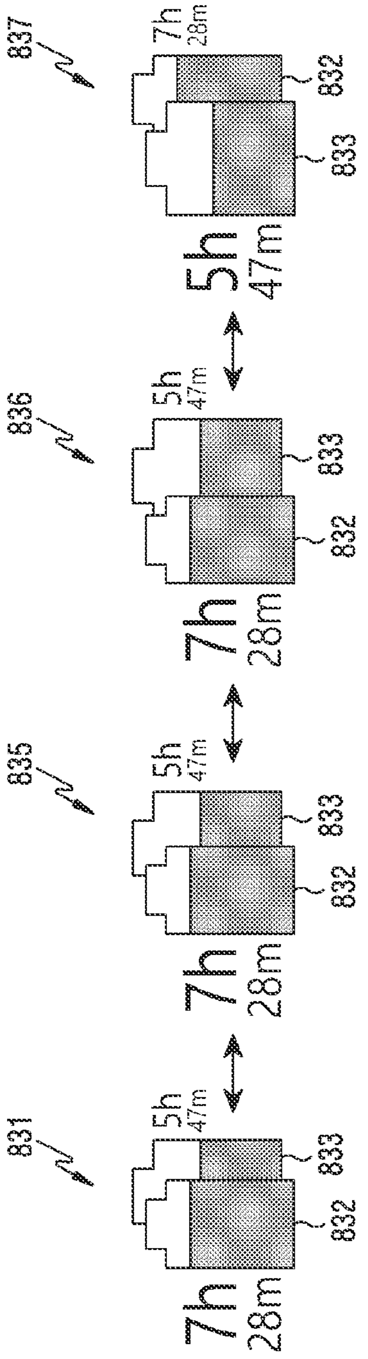
FIG. 8C is another example illustrating a scheme of displaying a first type indicator associated with a change in the size of a screen in an electronic device according to an embodiment.

FIG. 8C illustrates a change in a scheme of displaying an indicator in a case where a screen display area of the electronic device 200 is gradually extended according to an embodiment.

When the electronic device 200 is in the first state and the screen display area of the electronic device 200 has a first size corresponding to a minimum size, a first indicator 831 may be displayed. The first indicator 831 may include a first battery icon 832 and a second battery icon 833. The first battery icon 832 may indicate a battery residual capacity corresponding to the first size which is the minimum size of the screen display area. The second battery icon 833 may indicate a battery residual capacity corresponding to the maximum size of the screen display area.

In the first state, as illustrated, the first battery icon 832 may be expressed to be located in the front. The second battery icon 833 may overlap with the first battery icon 832 by a first distance and may not be seen.

When the electronic device 200 is in the second state and the screen display area of the electronic device 200 has a second size corresponding to the middle size, a second indicator 835 may be displayed.

When the change in the size of the screen display area is within a predetermined range, as illustrated, the display property of the first battery icon 832 may be maintained in the second indicator 835. Instead, the second battery icon 833 may overlap with the first battery icon 832 by a second distance shorter than the first distance, and the second battery icon 833 may be more exposed compared to the first state.

When the electronic device 200 is in the third state and the screen display area of the electronic device 200 has a third size corresponding to a middle size which is larger than the second size, a third indicator 836 may be displayed.

When the change in the size of the screen display area is within a predetermined range, as illustrated, the display property of the first battery icon 832 may be maintained in the third indicator 836. Instead, the second battery icon 833 may overlap with the first battery icon 832 by a third distance shorter than the second distance, and the second battery icon 833 may be more exposed compared to the second state.

When the electronic device 200 is in the fourth state and the screen display area of the electronic device 200 is extended to have a fourth size corresponding to a maximum size, a fourth indicator 837 may be displayed. The fourth indicator 837 may include a first battery icon 832 and a second battery icon 833.

In the fourth state, the display properties of the first battery icon 832 and the second battery icon 833 may be switched to each other, compared to the first state. As illustrated, the second battery icon 833 may be expressed to be located in the front, and the first battery icon 832 may be expressed to be hidden.

Figure 8D:
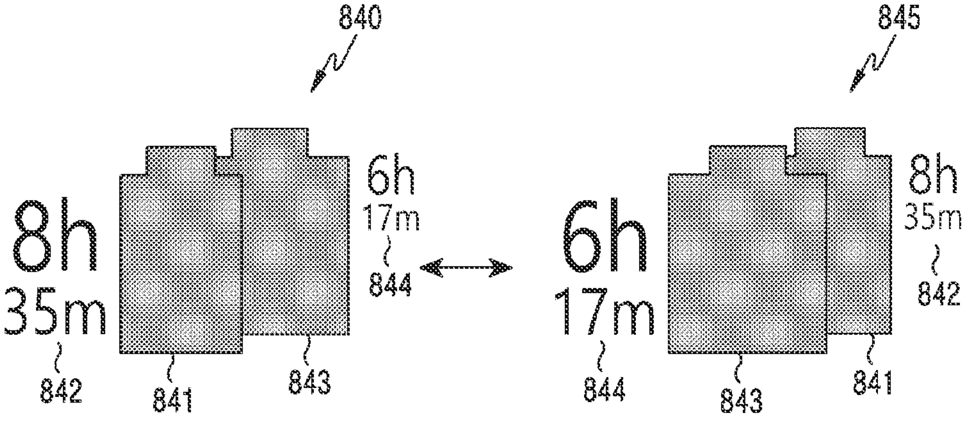
FIG. 8D is another example illustrating a scheme of displaying a first type indicator associated with a change in the size of a screen in an electronic device according to an embodiment.

FIG. 8D illustrates a change in a scheme of displaying a first type indicator in a fully charged mode in which an electronic device 200 is charged 100% according to an embodiment.

When the electronic device 200 is in a fully charged mode and in a first state in which a screen display area of the electronic device 200 has a minimum size, a first indicator 840 may be displayed. The first indicator 840 may include a first battery icon 841 and a second battery icon 843. The first battery icon 841 may be related to a battery residual capacity corresponding to the minimum size. A first battery usable time 842 corresponding to the minimum size may be displayed adjacent to the first battery icon 841. The second battery icon 843 may be related to a battery residual capacity corresponding to a maximum size of the screen display area. A second battery usable time 844 corresponding to the maximum size may be displayed adjacent to the second battery icon 843.

When the electronic device 200 is in a fully charged mode and in a second state in which the screen display area of the electronic device 200 has a maximum size, a second indicator 845 may be displayed.

As illustrated, in the second indicator 845, the display properties of the first battery icon 841 and the first battery usable time 842 and the display properties of the second battery icon 843 and the second battery usable time 844 may be switched to each other.

Figure 9A:
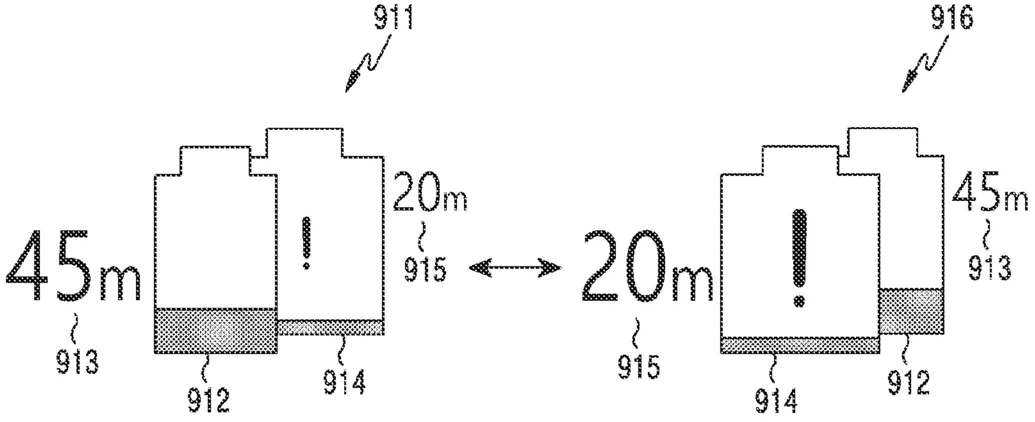
FIG. 9A is an example illustrating a scheme of displaying a first type indicator associated with a change in a power mode and the size of a screen in an electronic device according to an embodiment.
Figure 9B:
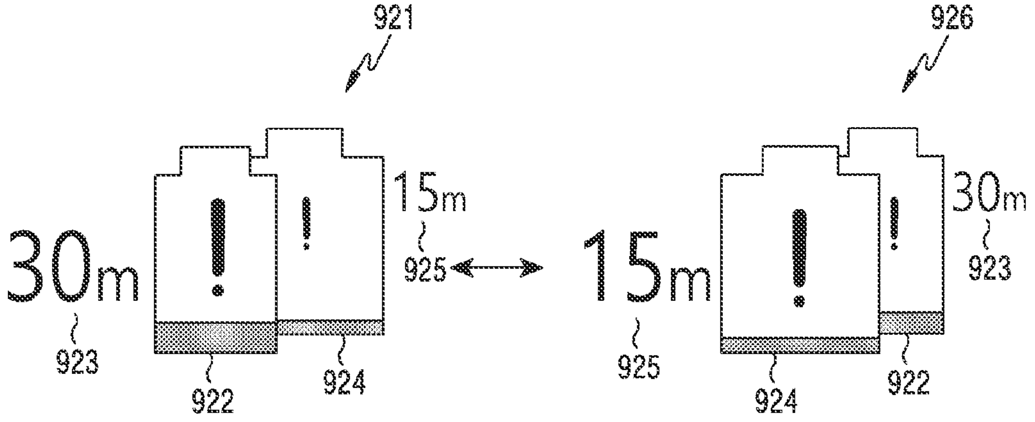
FIG. 9B is another example illustrating a scheme of displaying a first type indicator associated with a change in a power mode and the size of a screen in an electronic device according to an embodiment.
Figure 9C:
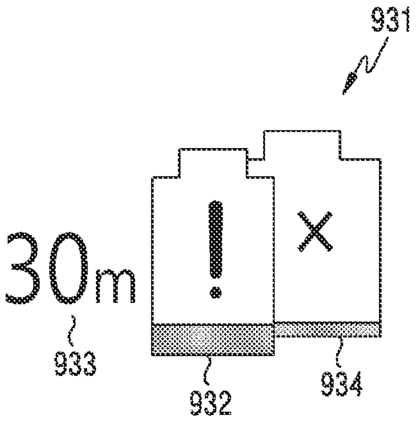
FIG. 9C is another example illustrating a scheme of displaying a first type indicator associated with a change in a power mode and the size of a screen in an electronic device according to an embodiment.

FIGS. 9A to 9C are examples illustrating a scheme of displaying a first type indicator associated with a change in a power mode and a screen size in an electronic device according to an embodiment.

Referring to FIG. 9A, the state of an electronic device 200 may switch from a first state to a second state and a screen display area may extend from a first size to a second size. For example, in the first state, the power mode of the electronic device 200 may be a normal mode, and in the second state, the power mode of the electronic device 200 may be a low power mode. When the screen display area is extended to the second size, switching to the low power mode may be expected.

The electronic device 200 may display a first indicator 911 in the first state. The first indicator 911 may include a first battery icon 912, a first battery usable time 913, a second battery icon 914, and a second battery usable time 915.

In the first indicator 911, each of the first battery icon 912 and the first battery usable time 913 may have a display property with a higher degree of visibility. Each of the second battery icon 914 and the second battery usable time 915 may have a display property with a lower degree of visibility.

The electronic device 200 may display a second indicator 916 in the second state.

In the second indicator 916, display properties of the first battery icon 912 and the first battery usable time 913 and display properties of the second battery icon 914 and the second battery usable time 915 may switch to each other. The second battery icon 914 and the second battery usable time 915 may be expressed to have higher visibility.

The second battery icon 914 may be expressed to include information (e.g., a picture of an exclamation mark) informing switching to the low power mode. A user may expect through the second battery icon 914 that the power mode switches to the low power mode when the screen display area is extended to the second size, or may intuitively recognize that the power mode has switched to the lower power when the screen display area is extended to the second size.

Referring to FIG. 9B, the electronic device 200 may switch from a first state to a second state and a screen display area may extend from a first size to a second size. For example, in both the first state and the second state, a power mode of the electronic device 200 may be a low power mode. A current battery residual capacity (e.g., a current battery usable time) may be less than a designated threshold value.

In the first state of the electronic device 200, the electronic device 200 may display a first indicator 921. The first indicator 921 may include a first battery icon 922, a first battery usable time 923, a second battery icon 924, and a second battery usable time 925.

In the second state of the electronic device 200, a second indicator 926 may be displayed.

The first battery icon 922 may be expressed to include information (e.g., a picture of an exclamation mark) informing the low power mode in the first state. The second battery icon 924 may be expressed to include information (e.g., a picture of an exclamation mark) informing the low power mode in the second state.

The user may identify through the first battery icon 922 and the second battery icon 924 that the electronic device 200 is in the low power mode in both the first state and the second state.

The example in FIG. 9C may correspond to a case where the electronic device 200 is in the low power mode in the first state (a reduced state or a state in which the screen display area has the first size) and an ultra-low power mode is expected when the state switches to the second state (an extended state or a state in which the screen display area has the second size). When the electronic device enters the ultra-low power mode, the battery 230 may be fully discharged shortly (within a predetermined time).

For example, the current battery residual capacity of the electronic device 200 may be less than a first threshold value (e.g., 30 minutes or 30%). The current battery residual capacity may be a battery residual capacity corresponding to the first size.

In the first state (the reduced state), the electronic device 200 may display a first indicator 931. The first indicator 931 may include a first battery icon 932, a first battery usable time 933, a second battery icon 934. When the state switches to the second state (the extended state), switching to an ultra-low power mode is expected, there is little battery usable time left, and thus a battery usable time according to the second state may be omitted from the first indicator 931.

The first battery icon 932 may include information (e.g., a picture of an exclamation mark) informing of lack of a battery residual capacity of the electronic device 200 and the low power mode in the first state. The second battery icon 934 may include information (e.g., "X" mark) informing entering the ultra-low power mode when the state switches to the second state.

In an embodiment, when a user input for switching the state of the electronic device 200 from the first state to the second state is detected, the electronic device 200 may identify whether a battery residual capacity corresponding to the second size is less than a second threshold value (e.g., 20 minutes or 20%). The second threshold value is used as a reference to determine whether to switch to the ultra-low power mode, and may be smaller than the first threshold value which is a reference for determining whether to switch to the low power mode.

When the battery residual capacity corresponding to the second size is less than the second threshold value, the electronic device 200 may perform at least one of an operation of outputting a user interface indicating lack of the battery residual capacity and an operation of blocking switching to the second state.

For example, the electronic device 200 may configure locking a state switching function or may output a user interface (e.g., a pop-up type message window or a notification sound) informing that switching of the state of the electronic device 200 is not allowed due to the lack of the battery residual capacity. When the locking is configured, even though a user input of requesting switching (e.g., extending) of the mechanical state is generated by the electronic device 200, control (e.g., motor control in a semi-automatic or automatic structure) for switching of the mechanical state may not be performed. When the locking is configured, even though the mechanical state of the electronic device 200 is changed from the first state to the second state upon the user input and a physical size of a display area is extended (e.g., a manual structure), the size of the screen display area in the second state may be maintained in the same size as that in the first state, regardless of such a change in the state.

Figure 10A:
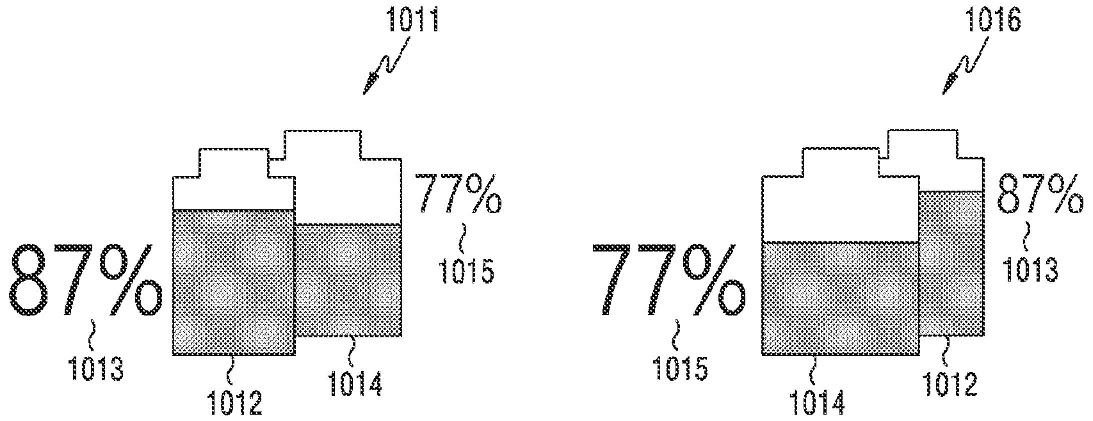
FIG. 10A is an example illustrating a scheme of displaying a second type indicator associated with a change in the size of a screen in an electronic device according to an embodiment.
Figure 10B:
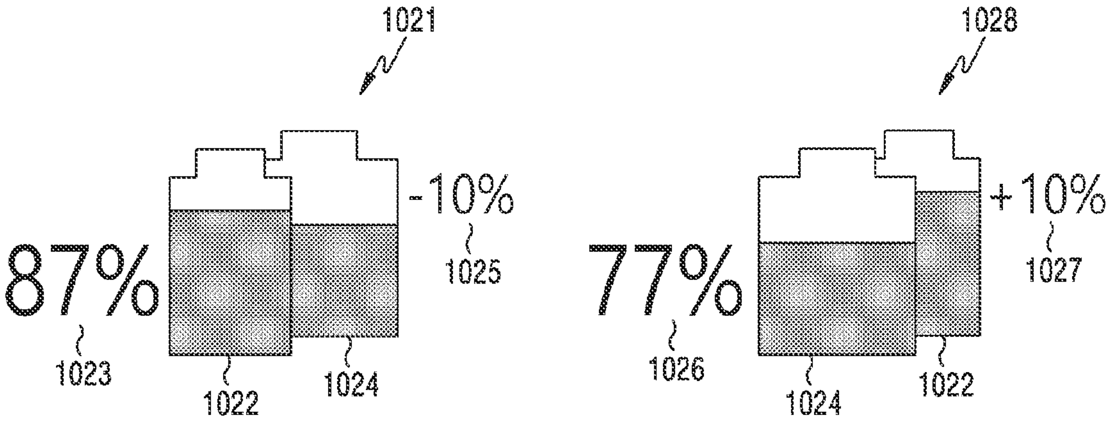
FIG. 10B is another example illustrating a scheme of displaying a second type indicator associated with a change in the size of a screen in an electronic device according to an embodiment.

FIGS. 10A and 10B are examples illustrating a scheme of displaying a second type indicator associated with a change in a screen size in an electronic device according to an embodiment.

The second type indicator may correspond to a user interface indicating information on a battery charging rate and/or a battery increase or decrease rate according to a change in the size of a screen display area.

Referring to FIG. 10A, the electronic device 200 may display a first indicator 1011 in a first state (reduced state) in which the screen display area has a first size. The first indicator 1011 may include a first battery icon 1012, a first battery charging rate 1031, a second battery icon 1014, and a second battery charging rate 1015. In the first indicator 1011, the first battery icon 1011 and the first battery charging rate 1013 may be expressed to have higher visibility. The first battery icon 1012 and the first battery charging rate 1013 may correspond to the first size.

The electronic device 200 may display a second indicator 1016 in a second state (extended state) in which the screen display area has a second size. In the second indicator 1016, a second battery icon 1014 and a second battery charging rate 1015 may be expressed to have higher visibility. The second battery icon 1014 and the second battery charging rate 1015 may correspond to the second size.

Referring to FIG. 10B, the electronic device 200 may display a first indicator 1021 in a first state (reduced state) in which a screen display area has a first size. The first indicator 1021 may include a first battery icon 1022 corresponding to the first size, a battery charging rate 1023 corresponding to the first size, a second battery icon 1024 corresponding to an extended second size, and a battery decrease rate 1025 expected upon the extension of the screen display area from the first size to the second size. The first battery icon 1022 and the battery charging rate 1023 may be displayed to be located in the front to stand out more.

In the second state (the extended state) in which the screen display area has the second size, the electronic device 200 may display a second indicator 1028. The second indicator 1028 may include a second battery icon 1024 corresponding to the second size, a battery charging rate 1026 corresponding to the second size, a first battery icon 1022 corresponding to the first size, and a battery increase rate 1027 expected upon the reduction of the screen display area from the second size to the first size. The second battery icon 1024 and the battery charging rate 1026 corresponding to the second battery icon may be displayed to be located in the front to stand out more.

Figure 11A:
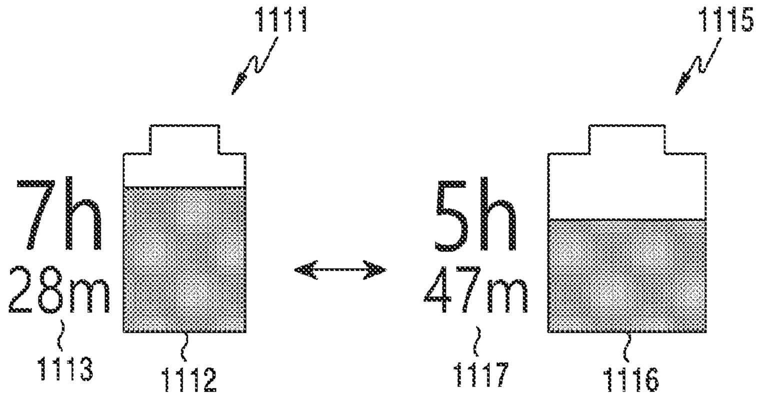
FIG. 11A is an example illustrating a scheme of displaying a third type indicator associated with a change in the size of a screen in an electronic device according to an embodiment.
Figure 11B:
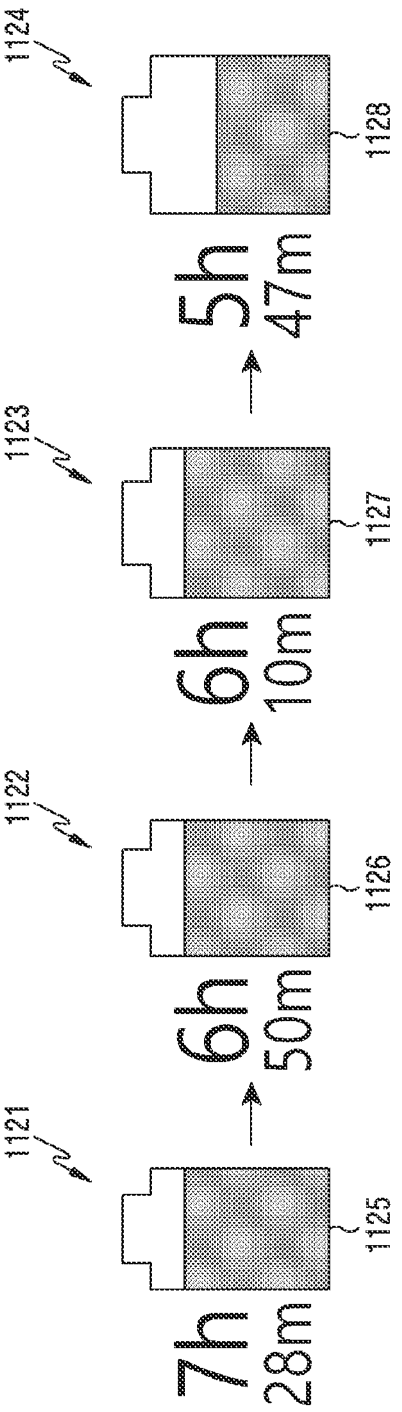
FIG. 11B is another example illustrating a scheme of displaying a third type indicator associated with a change in the size of a screen in an electronic device according to an embodiment.
Figure 11C:
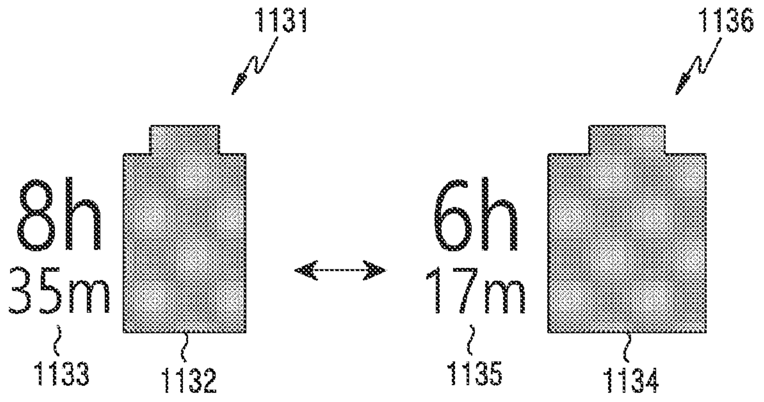
FIG. 11C is another example illustrating a scheme of displaying a third type indicator associated with a change in the size of a screen in an electronic device according to an embodiment.

FIGS. 11A to 11C are examples illustrating a scheme of displaying a third type indicator associated with a change in a screen size in an electronic device according to an embodiment.

A third type indicator may include one battery icon corresponding to a first size which is a current screen size.

When the screen size changes, the battery icon may be updated in accordance with the change in the screen size.

Referring to FIG. 11A, in a first state (reduced state) in which a screen display area has a first size, the electronic device 200 may display a first indicator 1111. The first indicator 1111 may include information on a first battery icon 1112 corresponding to the first size and a battery usable time 1113 corresponding to the first size.

The electronic device 200 may display a second indicator 1115 in a second state (extended state) in which the screen display area has a second size. The second indicator 1115 may include information on a second battery icon 1116 and a battery usable time 1117 corresponding to the second size. For example, as illustrated, the second battery icon 1116 may have a shape obtained by changing (e.g., extending) the size of the first battery icon 1112, based on a difference between the first size and the second size.

As illustrated, when the screen size is extended, the battery usable time may be reduced (a change from reference numeral 1113 to reference numeral 1117). When the screen size is reduced, the battery usable time may increase (a change from reference numeral 1117 to reference numeral 1113).

Referring to FIG. 11B, as the screen size of the electronic device 200 switches to a first size (a minimum size), a second size (a middle size), a third size (a middle size larger than the second size), and a fourth size (a maximum size), a first indicator 1121, a second indicator 1122, a third indicator 1123, and a fourth indicator 1124 may be sequentially displayed.

As illustrated, when the screen size is gradually extended, the battery residual capacity (e.g., the battery usable time) may gradually reduce upon the change in the screen size, and a change (a change in the sequence of reference numerals 1125, 1126, 1127, and 1128) in the battery residual capacity (e.g., the battery usable time) according to the change in the screen size may be expressed through the first indicator 1121, the second indicator 1122, the third indicator 1123, and the fourth indicator 1124.

FIG. 11C illustrates a change in a scheme of displaying a second type indicator is in a fully charged mode in which an electronic device 200 is charged 100% according to an embodiment.

When the electronic device 200 is in a fully charged mode and in a first state in which a screen display area of the electronic device 200 has a minimum size, a first indicator 1131 may be displayed. The first indicator 1131 may include information on a first battery icon 1132 and a first battery usable time 1133. The first battery icon 1132 may be related to the battery residual capacity corresponding to the minimum size. The first battery usable time 1134 corresponding to the minimum size may be displayed adjacent to the first battery icon 1132.

When the electronic device 200 is in a fully charged mode and in a second state in which the screen display area of the electronic device 200 has a maximum size, a second indicator 1136 may be displayed. The second indicator 1134 may include information on a second battery icon 1134 and a second battery usable time 1135. The second battery icon 1134 may be related to the battery residual capacity corresponding to the maximum size. The second battery usable time 1135 corresponding to the maximum size may be displayed adjacent to the second battery icon 1134.

Figure 12A:
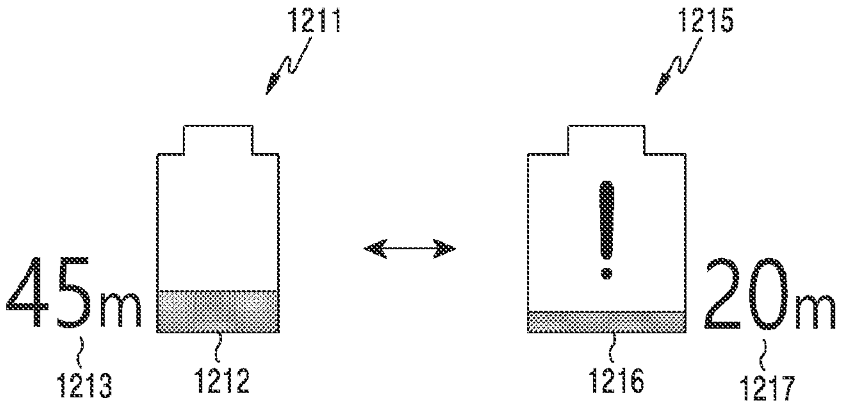
FIG. 12A is an example illustrating a scheme of displaying a third type indicator associated with a change in a power mode and the size of a screen in an electronic device according to an embodiment.
Figure 12B:
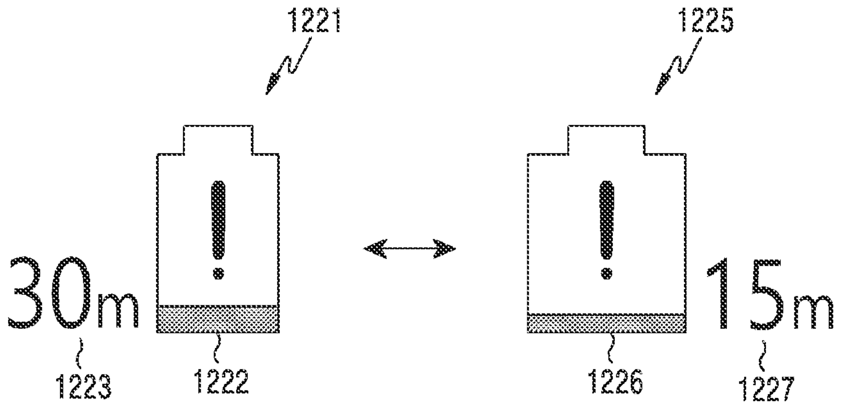
FIG. 12B is another example illustrating a scheme of displaying a third type indicator associated with a change in a power mode and the size of a screen in an electronic device according to an embodiment.
Figure 12C:
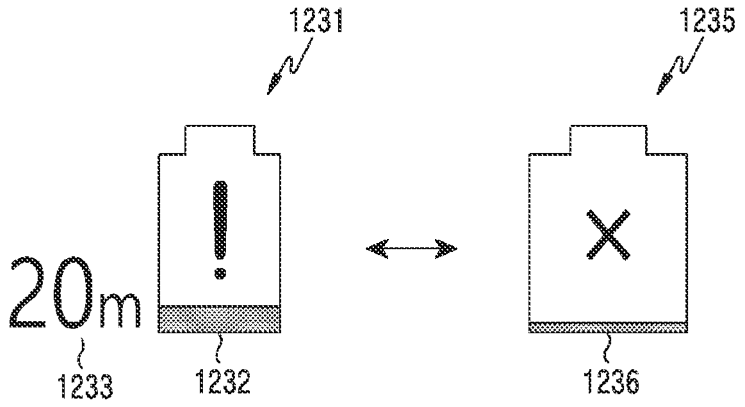
FIG. 12C is another example illustrating a scheme of displaying a third type indicator associated with a change in a power mode and the size of a screen in an electronic device according to an embodiment.

FIGS. 12A to 12C are examples illustrating a scheme of displaying a third type indicator associated with a change in a power mode and a screen size in an electronic device according to an embodiment.

Referring to FIG. 12A, the state of an electronic device 200 switches from a first state to a second state and a screen display area may extend from a first size to a second size. For example, in the first state, a power mode of the electronic device 200 may be a normal mode, and in the second state, the power mode of the electronic device 200 may be a low power mode. When the screen display area is extended to the second size, switching to the low power mode may be expected.

The electronic device 200 may display a first indicator 1211 corresponding to the first size in the first state. The first indicator 1211 may include a first battery icon 1212 and a first battery usable time 1213.

The electronic device 200 may display a second indicator 1215 corresponding to the second size in the second state. The second indicator 1215 may include a second battery icon 1216 and a second battery usable time 1217.

The second battery icon 1216 of the second indicator 1215 may be expressed to include information (e.g., a picture of an exclamation mark) informing switching to a low power mode. A user may expect through the second battery icon 1261 that the power mode switches to the low power mode when the screen display area is extended to the second size, or may intuitively recognize that the power mode has switched to the lower power when the screen display area is extended to the second size.

Referring to FIG. 12B, the electronic device 200 may switch from a first state to a second state and a screen display area may extend from a first size to a second size. For example, in both the first state and the second state, a power mode of the electronic device 200 may be a low power mode. A current battery residual capacity (e.g., a current battery usable time) may be less than a designated threshold value.

In the first state of the electronic device 200, the electronic device 200 may display a first indicator 1221. The first indicator 1221 may include a first battery icon 1222 and a first battery usable time 1223. The first battery icon 1222 may be expressed to include information (e.g., a picture of an exclamation mark) informing the low power mode in the first state.

In the second state of the electronic device 200, the electronic device 200 may display a second indicator 1225. The second indicator 1225 may include a second battery icon 1226 and a second battery usable time 1227. The second battery icon 1226 may include information (e.g., a picture of an exclamation mark) informing the low power mode in the second state.

The example in FIG. 12C may correspond to a case where the electronic device 200 is in the low power mode in the first state (a reduced state or a state in which the screen display area has the first size) and an ultra-low power mode is expected when the state switches to the second state (an extended state or a state in which the screen display area has the second size). When the electronic device enters the ultra-low power mode, the battery 230 may be fully discharged shortly (within a predetermined time). For example, the current battery residual capacity of the electronic device 200 may be less than a first threshold value (e.g., 30 minutes or 30%). The current battery residual capacity may be a battery residual capacity corresponding to the first size.

The electronic device 200 may display a first indicator 1231 in the first state. The first indicator 1231 may include a first battery icon 1232 and a first battery usable time 1233. The first battery icon 1232 may include information (e.g., a picture of an exclamation mark) informing the low power mode in the first state.

The electronic device 200 may display a second indicator 1235 in the second state. The second indicator 1235 may include a second battery icon 1236. The second battery icon 1236 include information (e.g., "X" mark) informing lack of a battery residual capacity and entering the ultra-low power mode when the state switches to the second state. When the state switches to the second state (the extended state), switching to an ultra-low power mode is expected, there is little battery usable time left, and thus a battery usable time according to the second state may be omitted from the second indicator 1235.

In an embodiment, when a user input for switching the state of the electronic device 200 from the first to the second state is detected, the electronic device 200 may identify whether a battery residual capacity corresponding to the second size is less than a second threshold value (e.g., 20 minutes or 20%). The second threshold value is used as a reference to determine whether to switch to the ultra-low power mode, and may be smaller than the first threshold value which is a reference for determining whether to switch to the low power mode.

When the battery residual capacity corresponding to the second size is less than the second threshold value, the electronic device 200 may perform at least one of an operation of outputting a user interface indicating lack of the battery residual capacity and an operation of blocking switching to the second state.

For example, the electronic device 200 may configure locking a state switching function or may output a user interface (e.g., a pop-up type message window or a notification sound) informing that switching of the state of the electronic device 200 is not allowed due to the lack of the battery residual capacity.

Figure 13:
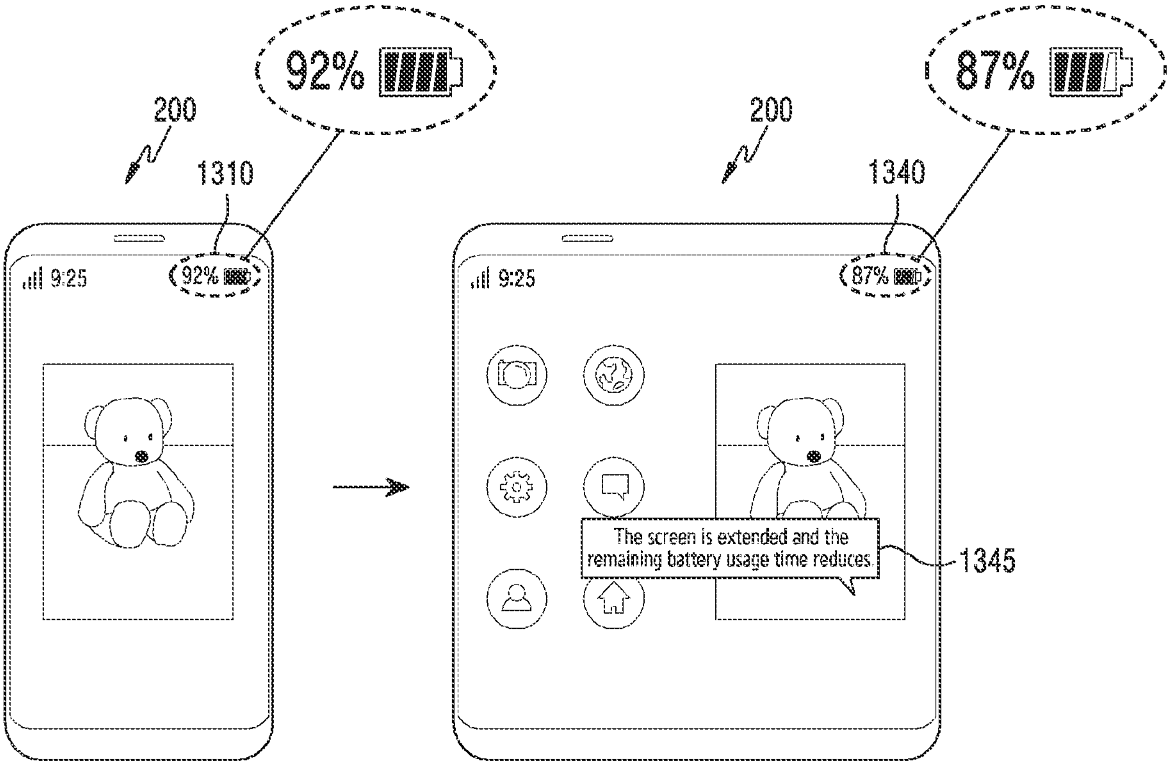
FIG. 13 illustrates a screen of displaying a user interface in an electronic device according to an embodiment.

FIG. 13 illustrates a screen displaying a user interface in an electronic device according to an embodiment.

According to an embodiment, an electronic device 200 may output a user interface such as a first screen 1310 in a first state (e.g., a slide-in state, a reduced state, or a folded state). The first screen 1310 may include a first indicator 1330. The first indicator 1330 may indicate a battery residual capacity (e.g., a 4-block charged icon and a 92% battery charging rate) corresponding to the first size which is the size of the screen display area in the first state.

When the mechanical state of the electronic device 200 switches from the first state to a second state (e.g., a slide-out state, an extended state, or an unfolded state), the screen display area may extend from the first size to the second size and the battery residual capacity may be reduced.

The electronic device 200 may output a user interface such as a second screen 1320 in the second state. The second screen 1320 may include a second indicator 1340. The second indicator 1340 may indicate a battery residual capacity (e.g., a 3-block charged icon and an 87% battery charging rate) corresponding to a second size which is the size of the screen display area in the second state. The electronic device 200 may output a user interface (e.g., a message window 1345 of the second screen 1320 or a notification sound) for informing that the battery residual capacity (e.g., a battery usable time) has changed according to the change in the screen display area.

In an embodiment, when a user input of switching the state of the electronic device 200 from a first state (e.g., a basic state or a state in which the size of the screen display area is a first size) to a second state (e.g., an extended state or a state in which the size of the screen display area is a second size) is detected, the electronic device 200 may output the user interface in response to the user input.

For example, as the state switches from the first state to the second state, the electronic device 200 may display the second indicator 1340 through the second screen 1320 in the second state. In addition, the electronic device 200 may display information indicating that "The screen is extended and the remaining battery usage time reduces." through the message window 1345 for a designated time (e.g., 3 seconds), or output a notification sound notifying the change in the battery residual capacity.

In another example, when the battery residual capacity identified according to the second size is less than the threshold value, the electronic device 200 may switch a power mode to a low power mode, and may display the second indicator indicating the current low power mode in the second state. In addition, the electronic device 200 may display information indicating that "If you use a current screen size, a power mode switches to a low power mode due to lack of a battery residual capacity." through a message window for a designated time (e.g., 3 seconds), or may output a notification sound notifying the switching to the low power mode.

In another example, the electronic device 200 may determine whether the battery residual capacity identified according to the second size is less than a threshold value before the state switches from the first state to the second state. When the battery residual capacity identified according to the second size is less than the threshold value, information indicating that "If you use a current screen size, a power mode switches to a low power mode due to lack of a battery residual capacity. Do you want to continue?" may be displayed through a message window to indicate the lack of the battery residual capacity in the first state. The message window may include a menu option (e.g., a yes or no menu option) for selecting whether to switch the state.

When the user approves the switching to the low power mode through the menu option, the power mode may switch to the low power mode. In addition, the state of the electronic device 200 switches to the second state and the size of the screen display area may change. In the second state, a display property (e.g., a designated color) indicating the low power mode may be applied to the second indicator.

In another example, the electronic device 200 may determine whether the battery residual capacity identified according to the first size is less than the threshold value before the state switches from the first state to the second state. When the battery residual capacity identified according to the first size is less than the threshold value, the switching to the second state may be blocked, information indicating that "Unable to extend the screen due to lack of the battery residual capacity" may be displayed through the message window to indicate the lack of the battery residual capacity in the first state, or a warning sound notifying that state switching is not possible may be output.

An electronic device (e.g., the electronic device 200 of FIG. 2) according to various embodiments may include a battery (e.g., the battery 230 of FIG. 2) configured to supply power to the electronic device, a display unit (e.g., the display unit 201 of FIG. 2), and at least one processor (e.g., the processor 220 of FIG. 2) connected to the battery and the display unit. The display unit may include at least one flexible display (e.g., the flexible display 210 of FIG. 2), wherein as a state of the electronic device switches from a first state to a second state, a screen display area among a display area of the at least one flexible display changes from a first area to a second area which is different from the first area. The at least one processor may be configured to display a first indicator relating to a battery residual capacity identified according to the size of the first area, through the first area in the first state, and display a second indicator relating to a battery residual capacity identified according to the size of the second area, through the second area in the second state.

According to various embodiments, the display unit may include a housing (e.g., the first housing 321 of FIGS. 3A and 3B), and a flexible display (e.g., the flexible display 310 of FIGS. 3A and 3B) inserted into the housing or extracted from the housing by a sliding operation. As the state of the electronic device switches from the first state to the second state by the sliding operation, a size of a screen display area exposed to the outside of the electronic device, among the display area of the flexible display, may change from a first size to a second size. The second indicator may be related to a battery residual capacity corresponding to the second size.

According to various embodiments, the display unit may include a first housing (e.g., the first housing 410 of FIGS. 4A, 4B, and 4C), a second housing (e.g., the second housing 420 of FIGS. 4A, 4B, and 4C), a flexible display (e.g., the flexible display 440 of FIGS. 4A, 4B, and 4C), the at least a part of which is supported by the first housing and the second housing, and a folding unit (e.g., the folding unit 430 of FIGS. 4A, 4B, and 4C) which allows the first housing and the second housing to be folded in an out-folding scheme. As the state of the electronic device switches from the first state to the second state by an operation of the folding unit, a size of a screen display area seen through a front surface of the electronic device, among the display area of the flexible display, may change from a first size to a second size. The second indicator may be related to a battery residual capacity corresponding to the second size.

According to various embodiments, the display unit may include a housing (e.g., the housing 501 of FIGS. 5A, 5B, and 5C) including a first housing and a second housing, a folding unit (e.g., the folding unit 530 of FIGS. 5A, 5B, and 5C) which allows the first housing and the second housing to be folded in an in-folding scheme, a first flexible display (e.g., the first flexible display 540 of FIGS. 5A, 5B, and 5C) coupled to one surface of the housing and exposed to the outside of the electronic device through the one surface, and a second flexible display (e.g., the second flexible display 550 of FIGS. 5A, 5B, and 5C) coupled to the other surface of the housing, unexposed to the outside of the electronic device in a folded state of the electronic device, and exposed to the outside of the electronic device through the other surface in an unfolded state of the electronic device. As the state of the electronic device switches from the first state to the second state by an operation of the folding unit, one display area of the first flexible display and the second flexible display may be solely activated. The second indicator may be related to a battery residual capacity corresponding to a size of the activated display area.

According to various embodiments, the display unit may include a first housing (e.g., the first housing 621 of FIGS. 6A, 6B, and 6C), a second housing (e.g., the second housing 622 of FIGS. 6A, 6B, and 6C), a third housing (e.g., the first housing 623 of FIGS. 6A, 6B, and 6C), a first folding unit (e.g., the first folding unit 624 of FIGS. 6A, 6B, and 6C) which allows the first housing and the second housing to be folded in a first folding scheme that is one of an in-folding scheme and an out-folding scheme, a second folding unit (e.g., the first folding unit 625 of FIGS. 6A, 6B, and 6C) which allows the second housing and the third housing to be folded in a second folding scheme that is the other one of the in-folding scheme and the out-folding scheme, and a flexible display (e.g., the flexible display 610 of FIGS. 6A, 6B, and 6C) disposed to traverse the first housing, the second housing, and the third housing. As the state of the electronic device changes from the first state to the second state by at least one operation of the first folding unit and the second folding unit, a size of a screen display area among the display area of the flexible display may change from a first size to a second size. The second indicator may be related to a battery residual capacity corresponding to the second size.

According to various embodiments, the first indicator may have a first display property indicating the size of the first area and a battery residual capacity corresponding to the size of the first area. The second indicator may have a second display property indicating the size of the second area and a battery residual capacity corresponding to the size of the second area.

According to various embodiments, while the electronic device is in the first state, the first indicator and the second indicator may be displayed together. As the state of the electronic device switches from the first state to the second state, respective display properties of the first indicator and the second indicator may be switched.

According to various embodiments, each of the first indicator and the second indicator may indicate information on at least one of a usable time of the battery, a charging rate of the battery, and an increase or decrease rate of the battery according to a change in the size of the screen display area.

According to various embodiments, the first indicator and the second indicator may display, differently from each other, at least one display property among a size, a color, a form, a shape, a pattern, transparency, an effect, a shadow, a type, a layer, and a layout.

According to various embodiments, the at least one processor may be configured to determine, when a user input for switching the state of the electronic device from a first state to a second state is detected, a power mode of the electronic device as at least one of a fully charged mode, a normal mode, a low power mode, an ultra-low power mode, based on a battery residual capacity corresponding to the size of the second area, and indicate information on the power mode of the electronic device through the second indicator.

According to various embodiments, the at least one processor may be configured to determine, when a user input for switching the state of the electronic device from the first state to the second state is detected, whether the battery residual capacity identified according to the size of the first area is less than a threshold value, and output a user interface indicating lack of the battery residual capacity when the battery residual capacity identified according to the size of the first area is less than the threshold value.

According to various embodiments, the at least one processor may be configured to block switching to the second state when the battery residual capacity identified according to the size of the first area is less than the threshold value.

An operation method of an electronic device according to various embodiments may include displaying, in a first state in which a screen display area among a display area of the at least one flexible display corresponds to a first area, a first indicator relating to a battery residual capacity identified according to a size of the first area, detecting a user input of switching a state of the electronic device from the first state to a second state, and displaying, in the second state in which the screen display area is changed to a second area having a size different from that of the first area, through the second area, a second indicator relating to a battery residual capacity identified according to the size of the second area.

According to various embodiments, the user input may be one of a sliding-out input, a sliding-in input, a folding input, an unfolding input, and a multi-folding input.

According to various embodiments, the first indicator may have a first display property indicating the size of the first area and a battery residual capacity corresponding to the size of the first area, and the second indicator may indicate the size of the second area and a battery residual capacity corresponding to the size of the second area.

According to various embodiments, while the electronic device is in the first state, the first indicator and the second indicator may be displayed together, and as the state of the electronic device switches from the first state to the second state, respective display properties of the first indicator and the second indicator may be switched.

According to various embodiments, each of the first indicator and the second indicator may indicate information on at least one of a usable time of the battery, a charging rate of the battery, and an increase or decrease rate of the battery according to a change in the size of the screen display area.

According to various embodiments, the first indicator and the second indicator may display, differently from each other, at least one display property among a size, a color, a form, a shape, a pattern, transparency, an effect, a type, a shadow, a layer, and a layout.

According to various embodiments, the method may further include, as the state of the electronic device switches from the first state to the second state, determining a power mode of the electronic device as at least one of a fully charged mode, a normal mode, a low power mode, an ultra-low power mode, based on the battery residual capacity identified according to the size of the second area. The second indicator may be displayed to indicate the power mode of the electronic device.

According to various embodiments, the method may further include, when a user input for switching the state of the electronic device from the first state to the second state is detected, determining whether the battery residual capacity identified according to the size of the first area is less than a threshold value, and outputting a user interface indicating lack of the battery residual capacity when the battery residual capacity identified according to the size of the first area is less than the threshold value.

The invention claimed is:

1. An electronic device comprising:

a housing comprising a first housing part and a second housing part configured to move with respect to the first housing part;

a battery configured to supply power to the electronic device;

a display unit comprising at least one flexible display, wherein, as a state of the electronic device switches from a first state to a second state, a size of a display area of the at least one flexible display which is exposed outside the housing changes from a first size to a second size; and at least one processor connected to the battery and the display unit, wherein the at least one processor is configured to:

display a first indicator relating to a first usable time identified based on a residual capacity of the battery and the first size, on the display unit in the first state, detect a change of the state of the electronic device from the first state to the second state, and display a second indicator relating to a second usable time identified based on the residual capacity of the battery and the second size, on the display unit in the second state.

2. The electronic device of claim 1, the electronic device comprising:

the housing, which the at least one flexible display is inserted into the first housing part or extracted from the first housing part by a sliding operation of the second housing part; and, wherein:

as the state of the electronic device switches from the first state to the second state by the sliding operation, a size of the display area viewable to the outside of the electronic device, changes from the first size to the second size.

3. The electronic device of claim 1, the electronic device comprising:

the first and second housing parts supportive of the at least one flexible display; and a folding unit which allows the first housing part and the second housing part to be folded in an out-folding scheme, wherein:

as the state of the electronic device switches from the first state to the second state by an operation of the folding unit, a size of the display area viewable through a front surface of the electronic device, changes from the first size to the second size.

4. The electronic device of claim 1, the electronic device comprising:

the first and second housing parts; and a folding unit which allows the first housing part and the second housing part to be folded in an in-folding scheme, wherein:

a first flexible display among the at least one flexible display is coupled to one surface of the housing and exposed to the outside of the electronic device through the one surface, a second flexible display among the at least one flexible display is coupled to another surface of the housing, unexposed to the outside of the electronic device in a folded state of the electronic device, and exposed to the outside of the electronic device through the other surface in an unfolded state of the electronic device, as the state of the electronic device switches from the first state to the second state by an operation of the folding unit, one display area of the first flexible display and the second flexible display is solely activated as an activated display area, and the second indicator is related to a usable time corresponding to a size of the activated display area.

5. The electronic device of claim 1, the electronic device comprising:

the first housing part;

the second housing part;

a third housing part;

a first folding unit which allows the first housing part and the second housing part to be folded in a first folding scheme that is one of an in-folding scheme and an out-folding scheme; and a second folding unit which allows the second housing part and the third housing part to be folded in a second folding scheme that is the other one of the in-folding scheme and the out-folding scheme, wherein:

the at least one flexible display is disposed to traverse the first housing part, the second housing part, and the third housing part, as the state of the electronic device changes from the first state to the second state by at least one operation of the first folding unit and the second folding unit, a size of the display area changes from the first size to the second size.

6. The electronic device of claim 1, wherein:

the first indicator has a first display property indicating the first size and the first usable time corresponding to the first size, and the second indicator has a second display property indicating the second size and the second usable time corresponding to the second size.

7. The electronic device of claim 1, wherein:

while the electronic device is in the first state, the first indicator and the second indicator are displayed together, and, as the state of the electronic device switches from the first state to the second state, respective display properties of the first indicator and the second indicator are switched.

8. The electronic device of claim 1, wherein each of the first indicator and the second indicator indicates information on at least one of a usable time of the battery, a charging rate of the battery, and an increase or decrease rate of the battery according to a change in the size of the display area.

9. The electronic device of claim 1, wherein the first indicator and the second indicator display, differently from each other, at least one display property among a size, a color, a form, a shape, a pattern, transparency, an effect, a shadow, a type, a layer, and a layout.

10. The electronic device of claim 1, wherein the at least one processor is configured to:

determine a power mode of the electronic device as at least one of a fully charged mode, a normal mode, a low power mode, an ultra-low power mode, based on the second usable time corresponding to the second size when a user input for switching the state of the electronic device from the first state to the second state is detected, and indicate information on the power mode of the electronic device through the second indicator.

11. The electronic device of claim 1, wherein the at least one processor is configured to:

determine whether the first usable time identified based on the residual capacity of the battery and the first size is less than a threshold value when a user input for switching the state of the electronic device from the first state to the second state is detected, and output a user interface indicating lack of the residual capacity of the battery when the first usable time is less than the threshold value.

12. The electronic device of claim 11, wherein the at least one processor is configured to block switching to the second state when the first usable time identified based on the residual capacity of the battery and the first size is less than the threshold value.

13. An operation method of an electronic device comprising at least one flexible display, the method comprising:

displaying, on a display area of the at least one flexible display in a first state in which a size of the display area corresponds to a first size, a first indicator relating to a first usable time identified based on a residual capacity of a battery and the first size;

detecting a change of a state of the electronic device from the first state to a second state in which the size of the display area corresponds to a second size; and displaying, on a display area of the at least one flexible display in the second state in which the size of the display area corresponds to a second size, a second indicator relating to a second usable time identified based on a residual capacity of a battery and the second size.

14. The method of claim 13, wherein a user input for the change of the state of the electronic device is one of a sliding-out input, a sliding-in input, a folding input, an unfolding input, and a multi-folding input.

15. The method of claim 13, wherein:

the first indicator has a first display property indicating the first size and the first usable time corresponding to the first size, and the second indicator has a second display property indicating the second size and the second usable time corresponding to the second size.

16. An electronic device comprising:

a flexible display configured to assume one of a first state characterized as having a display area of a first size and a second state characterized as having the display area of a second size; and a processor configured to:

display, on the display area of the first size, a first indicator relating to a first usable time identified based on a residual capacity of a battery according to the flexible display assuming the first state, detect a user input for switching the state of the electronic device from the first state to the second state, and display, on the display area of the second size, a second indicator relating to a second usable time identified based on the residual capacity of the battery according to the flexible display assuming the second state.

17. The electronic device of claim 16, wherein the flexible display moves between assuming the first state or the second state.

18. The electronic device of claim 1, wherein the first indicator and the second indicator are displayed together.

19. The electronic device of claim 1, wherein:

the first indicator has a first display property indicating the first size and the first usable time corresponding to the first size, and the second indicator has a second display property indicating the second size and the second usable time corresponding to the second size.

20. The electronic device of claim 1, wherein:

as the state of the electronic device switches between the first and second states, respective display properties of the first indicator and the second indicator are switched.

* * * * *